(12) United States Patent
Guedon et al.

(10) Patent No.: US 9,244,569 B2
(45) Date of Patent: Jan. 26, 2016

(54) CAPACITIVE SENSING ANALOG FRONT END

(75) Inventors: Yannick Guedon, Singapore (SG); Kien Beng Tan, Singapore (SG); Kusuma Adi Ningrat, Singapore (SG); Dianbo Guo, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 1384 days.

(21) Appl. No.: 12/972,159

(22) Filed: Dec. 17, 2010

(65) Prior Publication Data

US 2011/0242048 A1  Oct. 6, 2011

Related U.S. Application Data

(60) Provisional application No. 61/319,422, filed on Mar. 31, 2010.

(51) Int. Cl.
G06F 3/045 (2006.01)
G06F 3/044 (2006.01)

(52) U.S. Cl.
CPC .................... *G06F 3/044* (2013.01)

(58) Field of Classification Search
CPC ........................................ G06F 3/044
USPC .......................................... 324/684
See application file for complete search history.

(56) References Cited

U.S. PATENT DOCUMENTS

| 5,854,625 | A | 12/1998 | Frisch et al. | |
|---|---|---|---|---|
| 7,030,860 | B1 * | 4/2006 | Hsu et al. | 345/173 |
| 7,551,163 | B1 * | 6/2009 | Dotson | 345/173 |
| 8,390,361 | B2 * | 3/2013 | Ningrat | 327/337 |
| 2005/0192727 | A1 * | 9/2005 | Shostak et al. | 701/37 |
| 2008/0007534 | A1 | 1/2008 | Peng et al. | |
| 2009/0244014 | A1 | 10/2009 | Hotelling et al. | |
| 2009/0322410 | A1 | 12/2009 | David et al. | |
| 2010/0097077 | A1 | 4/2010 | Philipp et al. | |
| 2010/0149125 | A1 * | 6/2010 | Klinghult et al. | 345/174 |
| 2010/0149126 | A1 * | 6/2010 | Futter | 345/174 |
| 2011/0156839 | A1 * | 6/2011 | Martin et al. | 333/172 |
| 2011/0234528 | A1 * | 9/2011 | Guedon et al. | 345/174 |

OTHER PUBLICATIONS

Lei, Shuyu et al., An oversampled capacitance to voltage converter IC with application to time-domain characterization of MEMS resonators, IEEE Sensors Journal, V. 5, N. 6, Dec. 2005, p. 1353-1361.*

Lei et al., "An Oversampled Capacitance-to-Voltage Converter IC With Application to Time-Domain Characterization of MEMS Resonators", IEEE Sensors Journal, Dec. 2005, pp. 1353-1361, vol. 5, No. 6.

* cited by examiner

*Primary Examiner* — Thomas F Valone
(74) *Attorney, Agent, or Firm* — Gardere Wynne Sewell LLP

(57) ABSTRACT

A capacitive sensing analog front end for a touchscreen system having an improved signal-to-noise ratio includes a capacitance-to-voltage converter having an input for coupling to an external sampling capacitor, a summer having a first input coupled to an output of the capacitance-to-voltage converter, a low pass filter having an input coupled to an output of the summer and an output for providing an output signal; and a sample-and-hold circuit having an input coupled to the output of the low pass filter and an output coupled to a second input of the summer. The signal-to-noise ratio of the touchscreen system is improved by extracting the DC shift of a touch signal during a monitoring period and then subtracting the DC shift before integrating the touch signal.

18 Claims, 23 Drawing Sheets

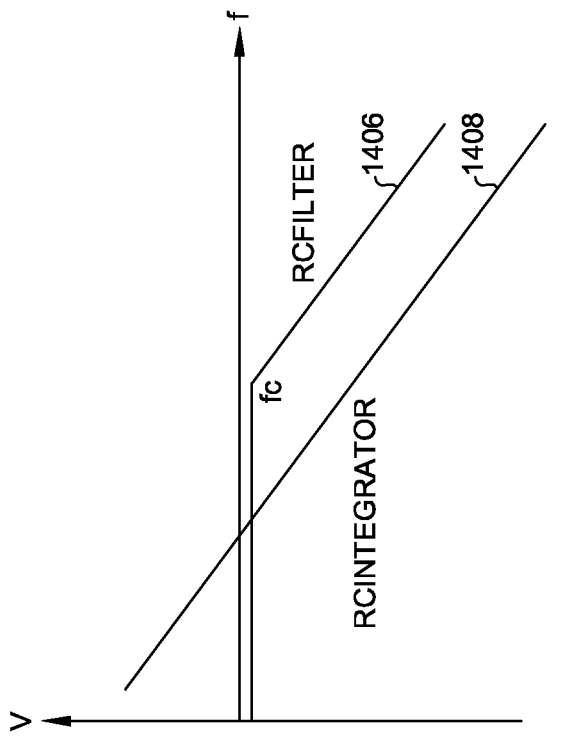
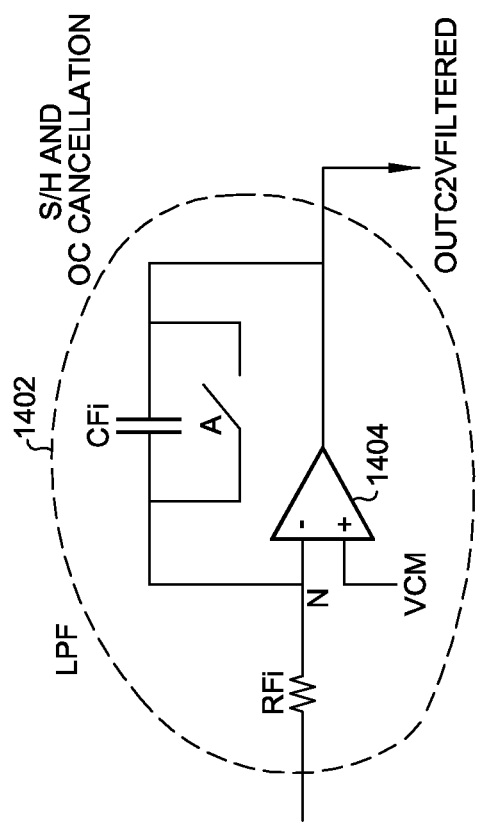
Fig. 8

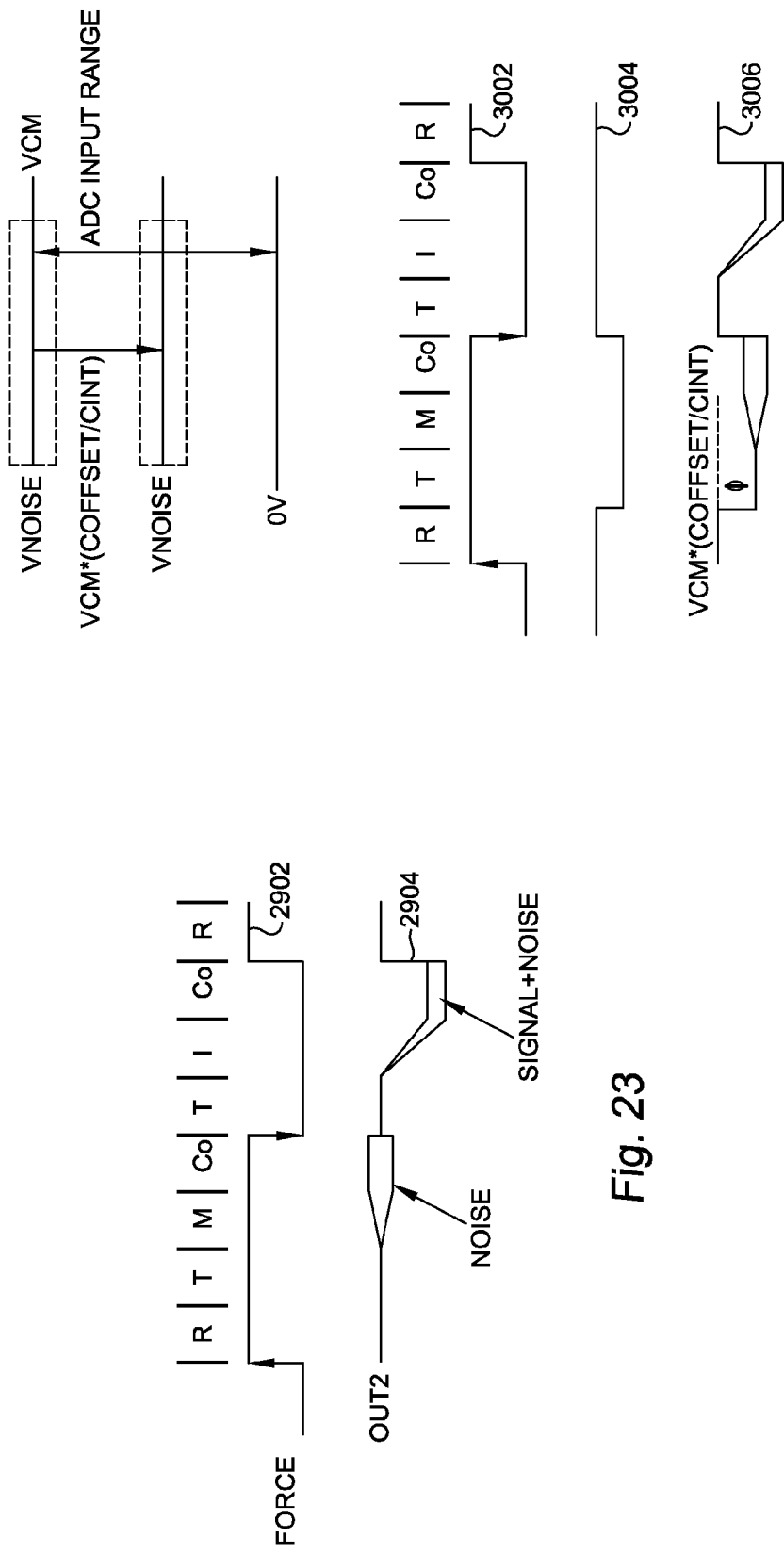

CAPACITIVE SENSING ANALOG FRONT END

Related Applications

The present application relates to and claims the benefit of priority to U.S. Provisional Patent Application No. 61/319,422 filed Mar. 31, 2010 and U.S. patent application Ser. No. 12/829,130 filed Jul. 1, 2010 which are hereby incorporated by reference in their entirety for all purposes as if fully set forth herein.

BACKGROUND OF THE INVENTION

1. Field of the Invention

The present invention is related to capacitive sensing touch screen systems, and, more particularly, to a touch screen system and related robust method of operation in which finger noise is rejected and the most accurate touch information possible is extracted.

In many electronic applications, a physical parameter can be monitored by the variation of a given capacitance. This is the case for pressure sensors, movement sensors, accelerometers, as well as other sensor circuits. In the case of projective capacitive touch technology, the capacitance to be measured is accessible through both terminals of a capacitor.

A projective capacitive touch matrix 100 is shown in FIG. 1 and described below. A portion 104 of the actual touch screen 102 is shown including a plurality of capacitors accessed by the R-lines (Rows) and C-lines (Columns). A finger 106 that is pressed against the touch screen portion 104 implicates four fringing capacitances 108. The perturbation by finger 106 can be sensed on the C-lines and the R-lines. The fringing capacitances exist on their own without the perturbation of a touching finger. The presence of the touching finger modifies the value of the fringing capacitances.

A touch screen is commonly a "transparent touch matrix", which is stacked on top of a display means. This is referred to as "on-cell" technology. The touch matrix can be also "merged" within the display mean and this is referred to as "in-cell" technology. In the example of FIG. 1, the touch matrix is a one layer ITO diamond type. Other types of touch screen systems are known in the art.

A touch device such as a touch screen is a means for detecting whether something (such as a finger, nail, pen, or anything else) is touching (touch detection) or approaching (proximity detection) the touch screen. The touch device must also detect the location of the touch event. The reading of the touch event is accomplished by measuring the Ci and Rj capacitance (Cs) variations. Capacitance Cs is composed of four fringing capacitances as is shown in further detail in FIG. 2. A portion 204 of the touch screen is shown showing the four fringing capacitances 208, the capacitance CFINGER of the finger 206, as well as the noise Vnpp associated with noise from a user's body.

There are many different ways to measure the Cs capacitance variations, but they are all based on the same principle. Predetermined known electrical quantities (voltage, current, charges . . . ) are forced into the touch matrix and, in response, certain modulated electrical values are read out from the matrix. The presence of a finger (as well as a nail, pen, or other item that may be used in conjunction with a touch screen) locally affects the electrical field that is created by the "forced electrical quantity" and the modulation of the value of the fringing capacitances and is detected as a touch event. The contact between the finger and the touch matrix can be assumed to be a capacitive contact (CFINGER as shown in FIG. 2), and the electrical noise present in the user's body is injected inside the touch matrix.

In all touch screen systems designs, what is desired is the ability to reject the finger noise and the ability to extract the most accurate touch information. The ability to sense whether in fact there is a touch or not and the strength and location of that touch is the main challenge in designing a capacitive sensing analog front end.

2. Relevant Background

Capacitive touch sensor technology is widely used in mobile, computing, and even in consumer applications. The working principle is that the touch screen capacitance is decreased when an object, i.e., a finger, is moving closer to a capacitor. The capacitance changes are detected by a sensor circuit to indicate existence of the object. The capacitance value is in the range of 1 pF to 5 pF and the capacitance change is about 10%. Hence detection of the capacitance value is very sensitive to any noise introduced in the system.

To be more precise, the capacitance decreases in the case of projective capacitance technology where a mutual capacitance is measured. However, some other technologies measure a self-capacitance (relative to ground) and, in these cases, the capacitance actually increases when a touch occurs.

There are various forms of capacitive touch sensor architectures known in the prior art. Several examples are listed below:

United States Patent Application Publication No. 2009/0244014 teaches a method using a charge amplifier (see FIG. 3A therein);

United States Patent Application Publication No. 2010/0097077 teaches a method using charge transfer and a clock period counter (see FIG. 3 therein);

United States Patent Application Publication No. 2008/0007534 teaches a method using a relaxation oscillator and a digital counter (see FIG. 3B therein);

U.S. Pat. No. 5,854,625 teaches a method using an oscillator (see FIG. 5 therein); and United States Patent Application Publication No. 2009/0322410 teaches a method using a charging period comparison (see FIG. 6 therein).

SUMMARY OF THE INVENTION

A capacitive sensing analog front end for a touchscreen system having an improved signal-to-noise ratio includes a capacitance-to-voltage converter having an input for coupling to an external sampling capacitor, a summer having a first input coupled to an output of the capacitance-to-voltage converter, a low pass filter having an input coupled to an output of the summer and an output for providing an output signal. The system also includes a sample-and-hold circuit having an input coupled to the output of the low pass filter and an output coupled to a second input of the summer. The signal-to-noise ratio of the touchscreen system is improved by extracting the DC shift of a touch signal during a monitoring period and then subtracting the DC shift before integrating the touch signal.

The method of the present invention comprises a reset phase where the input capacitance is reset, a monitoring phase where the noise is integrated, and an "instantaneous" cancelling event occurring at the early beginning of the integrating phase and lasting a short while. At this particular time, the previously integrated noise is cancelled. An integration phase is also included where the noise and the signal are both integrated.

BRIEF DESCRIPTION OF THE DRAWINGS

FIG. 8 is a Bode plot showing the output voltage versus frequency of an RC filter and an RC integrator;

FIG. 23 is a timing diagram associated with a fourth aspect of the present invention;

FIG. 24 is an additional timing diagram associated with the fourth aspect of the present invention.

DETAILED DESCRIPTION OF THE PREFERRED EMBODIMENTS

Figure 1:
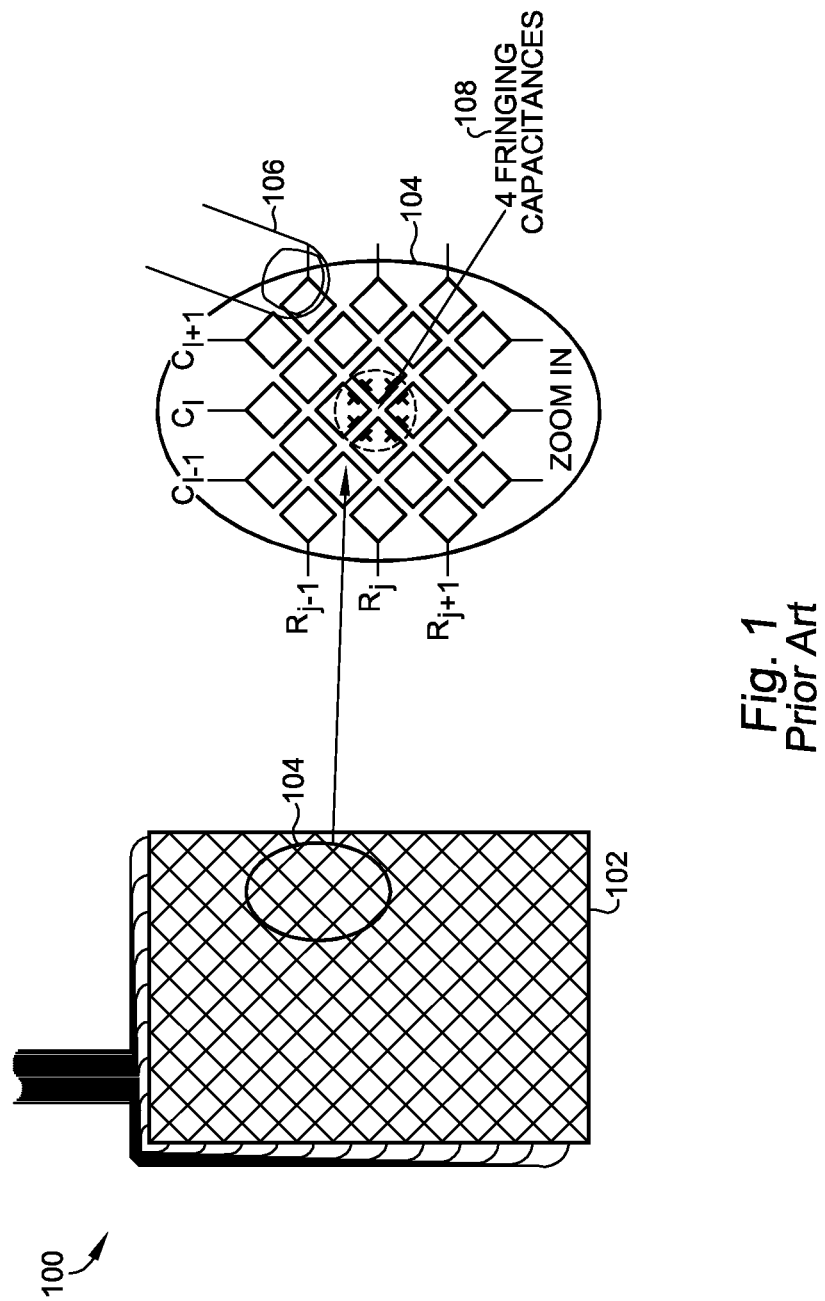
FIG. 1 is a plan view of a one layer ITO diamond type touch screen according to the prior art.
Figure 2:
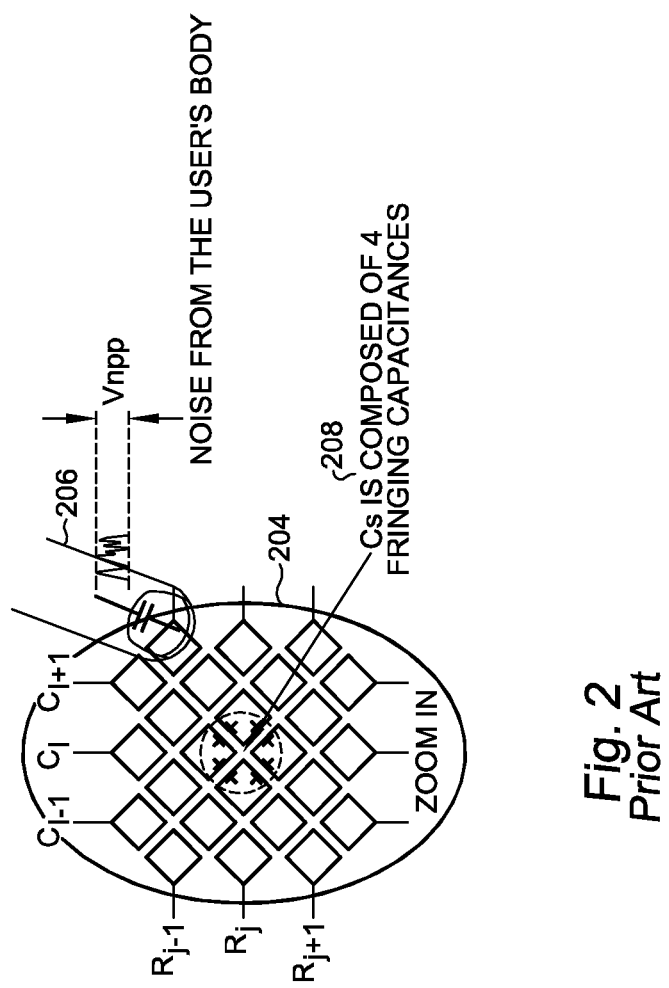
FIG. 2 is the same plan view of FIG. 1, but showing a noise signal produced by the presence of an external touch from a user's body.
Figure 3:
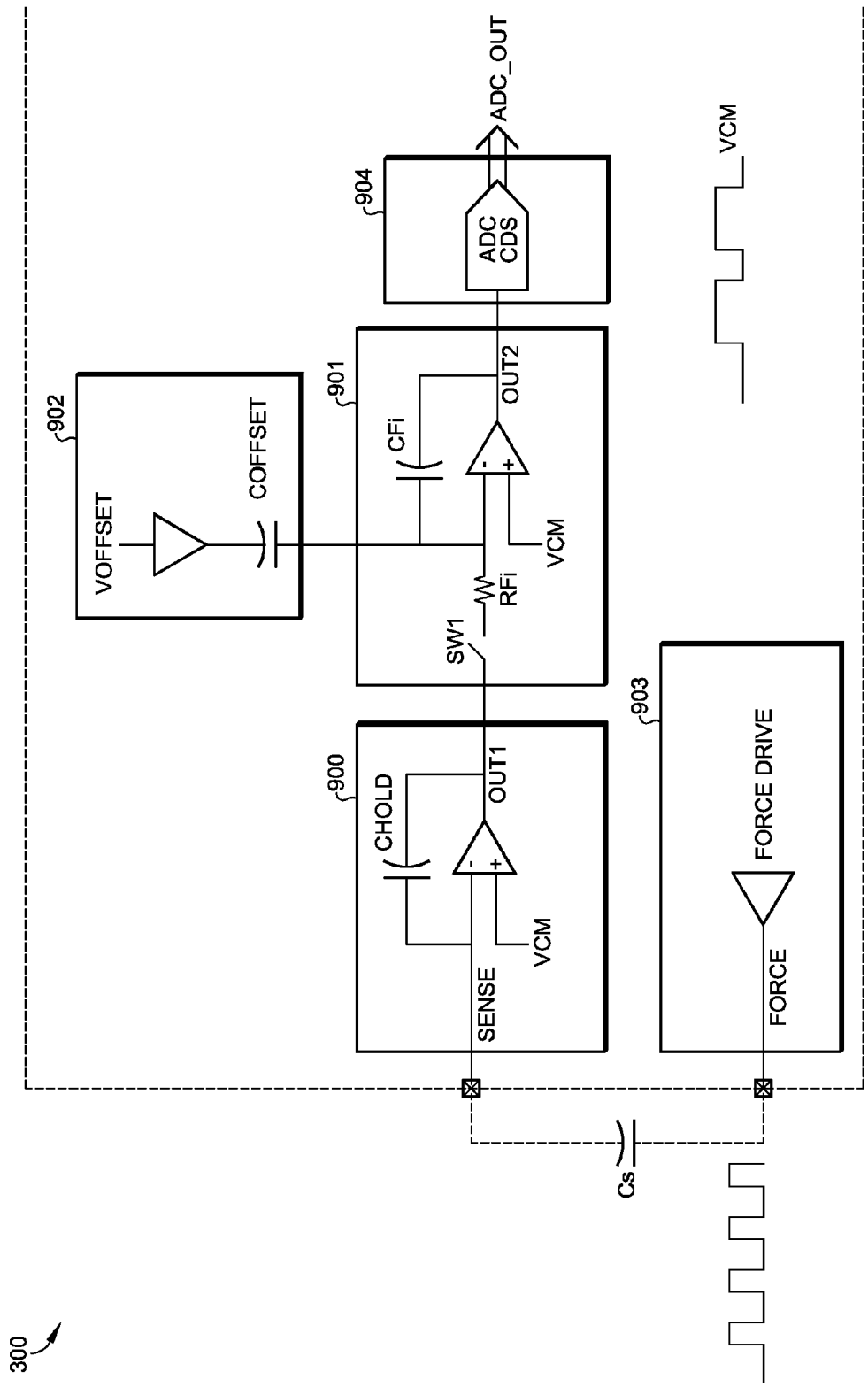
FIG. 3 is an overall block diagram of a touch screen sensing system according to the present invention.

According to the present invention, an overall block diagram of the touch screen sensing system 300 is shown in FIG. 3. FIG. 3 shows the overall architecture of the capacitive sensing analog front end according to the present invention. It is important to note that the architecture of the front end and the associated timing diagram distinguish the present invention from other known technologies described above. The key performance of any front end are related to the size (the size must be small, so that corresponding costs can be contained), the speed (the speed of operation must be as fast as possible in order to accurately follow human gestures), and the power consumption (the power consumption must be low for use in mobile devices if desired). Also, the noise rejection performance is crucial to make sure that a mobile device using the touchscreen system can work in any hostile environment.

The capacitive touch sensor according to the present invention includes four main parts which are described with respect to their contribution to the overall system performance.

Circuit 900 is a charge amplifier to convert the capacitor Cs into a voltage. The charge amplifier includes a CHOLD capacitor and receives a common mode voltage (VCM) on the positive input. A SENSE voltage is received on the negative input of the amplifier, and an OUT1 voltage is provided at the output of the amplifier. Circuit 901 is an RC charge integrator used to filter out the HF noise and to provide the LF noise information. Circuit 901 includes an amplifier that also receives the VCM voltage at the positive input and is switched to the output of circuit 900 through switch SW1. A CFi capacitor is provided between the output voltage OUT2 and the negative input of the amplifier. Circuit 902 is an integrator output level shifter used to shift the integrator output DC voltage in order to measure the noise level using an Analog to Digital data Conversion (ADC) as described below. Circuit 902 includes a buffer amplifier for receiving a dynamic offset voltage VOFFSET, and also includes an output capacitor COFFSET. Circuit 903 is a force driver amplifier used to drive the capacitor Cs with a FORCE signal. Circuit 904 is an ADC and CDS circuit used to operate the ADC as well as a Correlated Double Sampling (CDS) operation so as to cancel (digitally) the LF noise and generate an output signal ADC OUT. It should be noted that the CDS operation can be performed as well in the analog domain as will be explained in further detail below.

Figure 4:
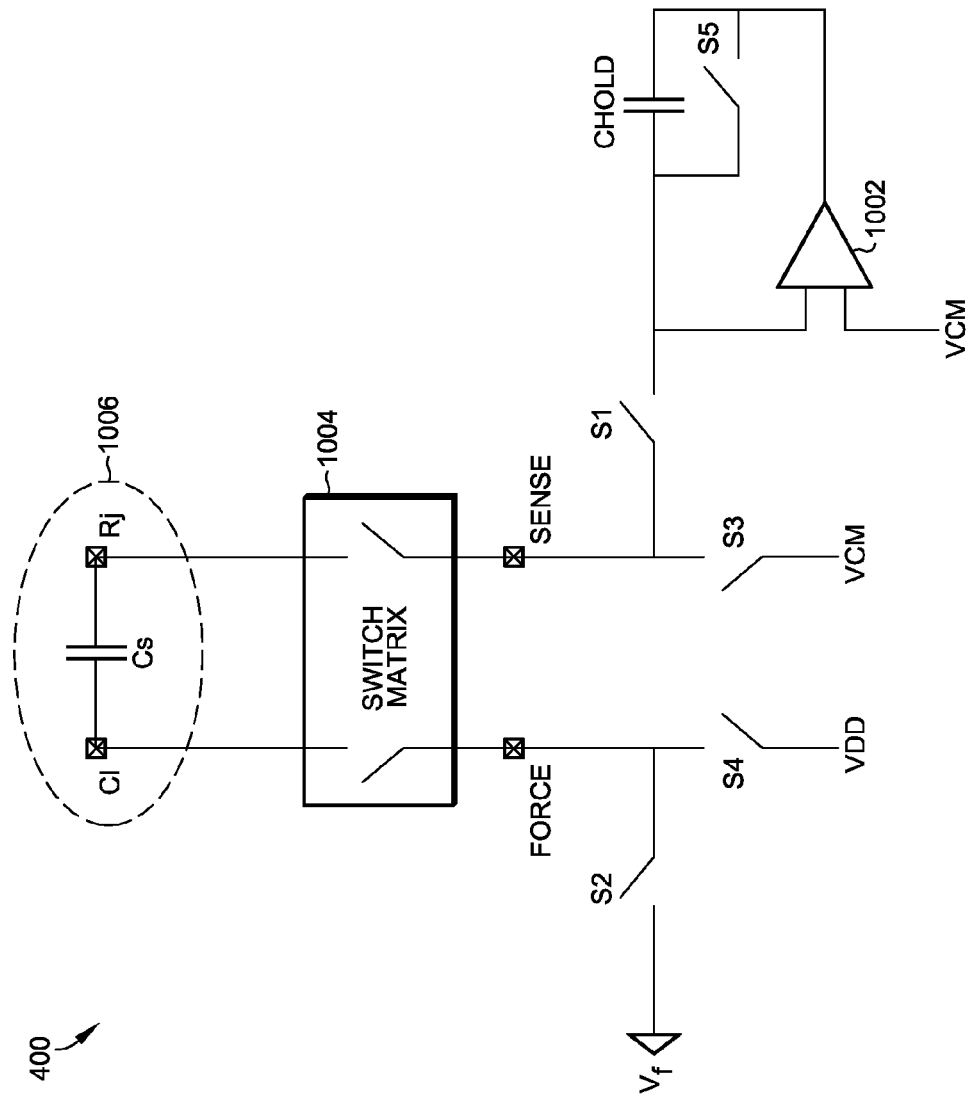
FIG. 4 is a schematic diagram of a state of the art charge amplifier (C2V converter)

A state of the art charge amplifier 400 (a standard current to voltage (C2V) converter) is shown in FIG. 4. A switch matrix 1004 contains switches for connecting the Cs external capacitance 1006 to be monitored, to the monitoring electronics. The monitoring electronics includes switches S1, S2, S3, S4, and S5, amplifier 1002, and hold capacitor CHOLD. The switch matrix 1004 is coupled to the Force and Sense lines as shown. The C2V converter 400 operates a force and sense cycle across the capacitance as described below.

C2V operation and ADC conversion is now described, wherein Φ0, Φ1, and Φ2 are the phases of the C2V operation.

During phase Φ0 (Sample): Cs and CHOLD are reset by actuating switches S3, S4 and S5 (S1 and S2 are deactuated) so that the FORCE and SENSE nodes are "Forced" respecitively to the VDD and VCM voltages.

During phase Φ1 (Integrate): The charges are transferred from Cs into CHOLD by actuating switches S1 and S2 (S3, S4 and S5 are deactuated) so that the FORCE node is "forced" to ground while the SENSE node is "sensed".

During phase Φ3 (Hold): the capacitor Cs is reset, similarly to the Φ2 phase by actuating switches S3 and S4, but CHOLD is not reset (so switch S5 is not actuated).

ADC starts its operation on the signal OUT. This operation can last for the duration of phase Φ3.

For a thorough understanding of the invention, the Signal to Noise Ratio (SNR) of the system must be explained in further detail.

For a given Cs, the output voltage (Vout) for the signal OUT is given by:

Vout=VCM+Cs/CHOLD*Vf, wherein: VCM is the common mode voltage, for example, equal to 0.9V, and Vf is the forcing voltage at the FORCE node, for example, equal to 1.8V.

And for a variation $\Delta$Cs, the variation of output voltage is given by:

Signal=$\Delta$Vout=$\Delta$Cs/CHOLD*Vf

Figure 5:
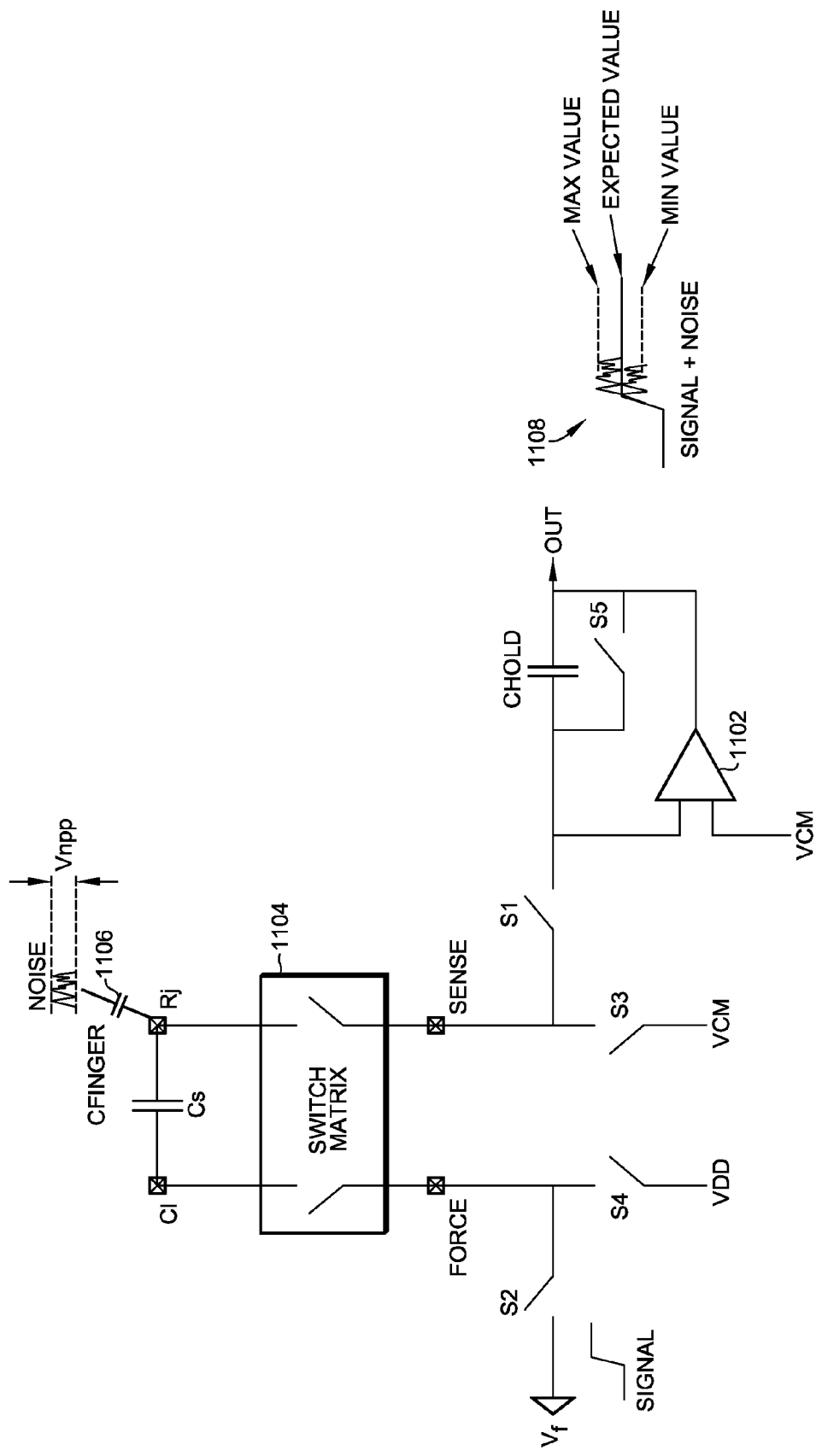
FIG. 5 is the schematic diagram of FIG. 4, perturbed with an externally induced noise signal.

In a similar manner, one can derive the variation of the output voltage resulting from the introduction of a noise inside the system. The noise being for example introduced by a human body touching the "right terminal" of the Cs, this terminal being the sensing terminal of the monitoring circuitry. Such a contact would be typically of a capacitive nature, and the electrical schematic is as shown in FIG. 5, including amplifier 1102, switch matrix 1104, and front capacitance 1106, as well as switches S1-S5. And from there, the SNR (Signal to Noise Ratio) can be estimated.

Referring now to FIG. 5, the output voltage resulting from the noise input is given by:

$\Delta$Vout=CFINGER/CHOLD*Vnpp

Depending on when the switch S1 is closed, the output voltage includes a DC shift.

As a result the $\Delta$Voutpp is affected by a factor of two and can reach:

noise=$\Delta$Voutpp=2*CFINGER/CHOLD*Vnpp

And the SNR is given by:

SNR=$\Delta$Cs/(2*CFINGER)*(Vf/Vnpp)

Choosing $\Delta$Cs=0.2 pF, CFINGER=0.5 pF, Vf=1.8V and Vnpp=2V
SNR=0.18
Assuming that CHOLD=6 pF (C2V converter being able to handle up to Cs=3 pF):
the output swing is 600 mV for 2 pF
the quantity of signal corresponding to a 0.2 pF variation is 60 mV; and
the output peak-to-peak noise can reach 333 mV.

In other words, the "useful" signal/information cannot be extracted from the noisy output voltage.

In FIG. 5, the signal and noise 1108 is shown having a maximum value, a minimum value, and an expected value.

A review of the solutions to improve the SNR is now described.

The SNR is given by:

SNR=$\Delta$Cs/(2*CFINGER)*(Vf/Vnpp)

As $\Delta$Cs, CFINGER are environment dependent, the two only parameters obviously accessible to improve the SNR are the Vf and the Vnpp.

Known solutions in prior art are:

Boosting the "signal" by using a "high" voltage (in the range of 20V) for the Force voltage applied to the capacitance at the FORCE node.

Lowering the "noise" by reducing the noise bandwidth by making use of a non-DC force signal and demodulating the signal for the monitoring (the "noise is the useful band" is reduced).

Proceeding to multi data extraction and averaging them.

These solutions are technically proven to work but they might be either not cost effective, complicated to implement, or not suitable regarding some other performance like consumption and/or size and/or speed.

The present invention is a simple solution that can be implemented in any low voltage CMOS technology.

Figure 6:
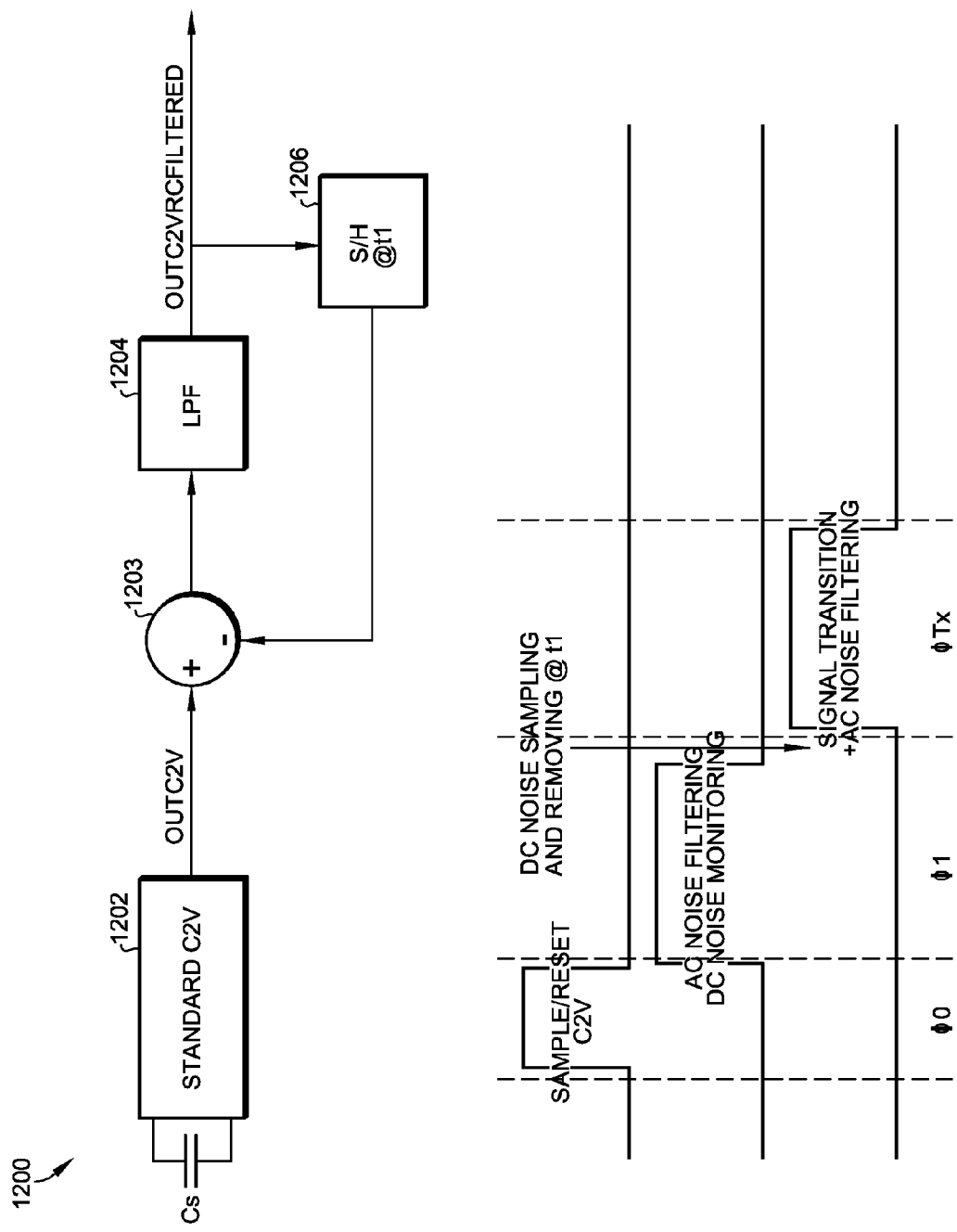
FIG. 6 is a circuit diagram and corresponding diagram for improving SNR by analog cancellation of noise according to a first aspect of the present invention.

A first aspect of the invention concerned with improving SNR by an analog cancellation of the noise is now described. A circuit diagram 1200 and corresponding timing diagram is shown in FIG. 6. The circuit diagram 1200 includes a standard C2V block 1202 coupled to an external Cs capacitor for providing an output (OUTC2V) voltage. The OUTC2V voltage is passed to the positive input of a summer 1203. The output of summer 1203 is received by the input of a Low Pass Filter (LPF) 1204 to provide the output (OUTC2VRCFILTERED) voltage as shown. This voltage is received by a Sample and Hold (S/H) block 1206. The output of the S/H block 1206 is fed back to the negative input of summer 1203. During Phase $\Phi$0, a sample/reset pulse is generated for operating the C2V block 1202. During sub-phase $\Phi$1, an AC noise filtering and DC noise monitoring pulse is generated. During a sub-phase $\Phi$Tx, a signal transition and AC noise filtering pulse is generated.

According to the method of the present invention the LF noise (DC shift) is extracted during a monitoring period of sub-phase $\Phi$1 and then subtracted before proceeding to the integration of the signal. This is an analog cancellation of the LF noise, and an analog filtering of the HF noise.

During the first phase $\Phi$0, the Touch Matrix and C2V stage are reset. This corresponds to $\Phi$0 shown in FIG. 6 and $\Phi$0 previously described (in the state of the art circuit of FIG. 5).

During the second phase, the integration starts but the force signal is not activated. In other words, the second phase is split into two sub-phases.

During a first sub-phase $\Phi$1 of the second phase for which the switch S1 is actuated (but the switch S2 is not actuated so that no force voltage Vf is applied to the FORCE node), with reference to the switches identified in FIG. 5, the output voltage for the signal OUTC2V is Low-Pass-Filtered and the LF noise (i.e., the DC shift introduced at the time when S1 was turned ON) is extracted through the Low-Pass filter.

At the end of this first sub-phase $\Phi$1 of second phase, the DC shift is held inside the S/H block 1206 (for example, in a capacitance) and it is subtracted directly at the output of the C2V converter using summer 1203.

During a second sub-phase $\Phi$Tx, the switch S2 is turned-on (with switch S1 remaining ON) and the output of the C2V can swing (OUTC2V) while being perfectly "centered" in terms of DC voltage, while the AC is filtered by the LPF.

The accuracy of the DC shift cancellation as well as the remaining AC amplitude at the output of the filter (OUTC2VRCFILTERED) directly condition the SNR value.

Figure 7:
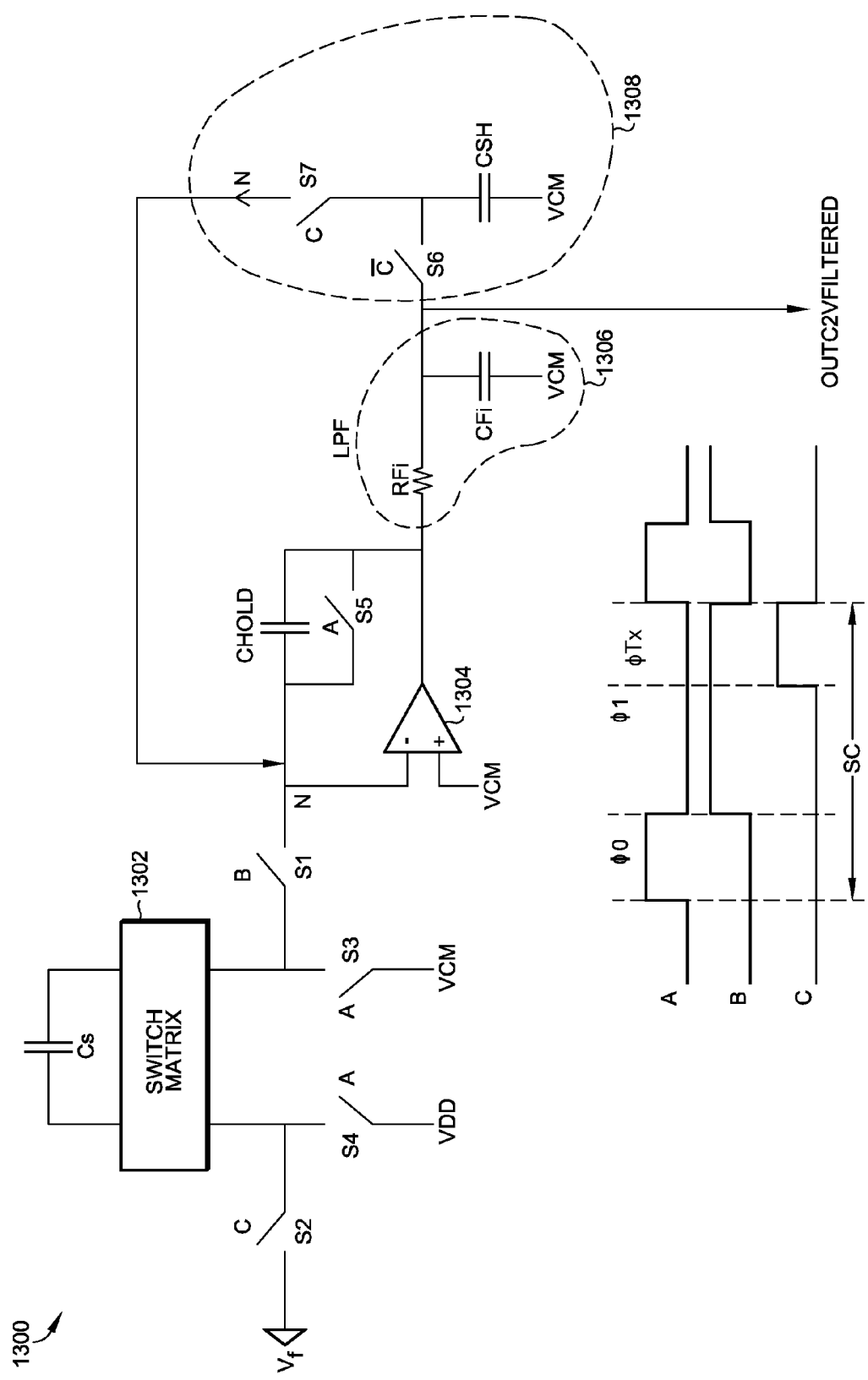
FIG. 7 is a more detailed circuit diagram for implementing the circuit of FIG. 6 according to the present invention.

A first implementation of the first aspect of the present invention is now described in further detail, with respect to FIG. 7. The circuit 1300 shown in FIG. 7 is a touch screen system according to the present invention including a switch matrix 1302 coupled to a Cs capacitor, a plurality of switches with corresponding phase control node information (A, B, C), a charge amplifier 1304 having a switched CHOLD capacitor, a low pass filter 1306 including a resistor RFi and a capacitor CFi coupled to the VCM voltage. The low pass filter is coupled to the sample and hold circuit 1308 by switch S6. The S/H circuit 1308 is represented as a switched capacitor CSH having an output through switch S7 at node N that is connected in feedback to the negative input of the amplifier 1304.

The system is designed so as its behavior remains linear during the sub-phase $\Phi$TX rising transition. This is a condition to ensure the continuity of the noise signal over the sub-phase $\Phi$Tx rising transition. The condition is easy to fulfill as long as the slewing of the amplifier is faster than the RC time constant of the touch panel itself.

The DC shift is memorized inside a capacitor CSH having a capacitance value strictly equal to the holding capacitance of capacitor CHOLD and the charge is pushed inside CHOLD just at the beginning of second sub-phase ΦTx. It is important to note that the DC shift cancellation is performed inside the C2V converter. The corresponding control signal at each of the phases and sub-phases for the switches S1-S7 are shown as given below. During a first phase Φ0 of a sensing cycle SC, signal A is high, signal B is low, and signal C is low (so switches S3, S4, S5 and S6 are on and switches S1, S2 and S7 are off. During a first sub-phase Φ1 of the sensing cycle SC, signal A is low, signal B is high, and signal C is low (so switches S1 and S6 are on, and switches S2, S3, S4, S5 and S7 are off). During a second sub-phase ΦTx of the sensing cycle SC, signal A is low, signal B is high, and signal C is high (so switches S1, S2 and S7 are on, and switches S3, S4, S5 and S6 are off).

The performance of circuit 1300 shown in FIG. 7 is now discussed. By subtracting the DC shift (from capacitor CSH through switch S7 in negative feedback to the negative input of the amplifier 1304), the SNR is already improved by a factor of two. By filtering the AC noise, the SNR at a given frequency f (above the RC filter cut-off frequency) is improved by the ratio f/fc:

$$SNR=\Delta Cs/C_{FINGER}*(V_f/V_{npp})*f/fc$$

To illustrate the amount of the improvement, an example is given where the noise is considered to be a pure tone at 450 kHz for which the SNR without improvement is SNR=0.18

With the improvement:
(with ΔCs=0.2 pF, CFINGER=0.5 pF, Vf=1.8V, Vnpp=2V, f=450 kHz, fcl=191 kHz)
SNR=0.84
The SNR has thus been improved by 4.6 times As previously discussed, the accuracy of the DC shift cancellation as well as the remaining AC amplitude at the output of the filter (OUTC2VRFILTERED) directly condition the SNR value. The main limitation of using the RC filter is related to its response time. For a given cut-off frequency of the RC filter, it takes about 6*R*C for the output of the filter to settle properly to its final value. In other words, for the duration of a given integration, the cut-off frequency cannot be set too low. As a result, even if the DC shift is perfectly cancelled, the AC remaining component still remains, affecting the SNR.

An alternative to the simple RC filter is to use a RC integrator 1402 as shown in FIG. 8. The RC integrator 1402 includes an amplifier 1404, an input resistor RFi, and a switched feedback capacitor CFi. The corresponding transfer functions versus frequency graph for the RC filter and the RC integrator are also shown in FIG. 8 (Bode plots 1406 and 1408).

The duration of the integration has to be adjusted so the output of the integrator never exceeds a maximum swing. When the output of the C2V converter is at its maximum swing (VDD), the output swing at the output of the integrator within a period tint is ΔVout=VDD/2R*tint/C, and tint is adjusted to be equal to RC so as ΔVout never exceeds VDD/2. In other words, the RC integrator has a gain equal to the unity.

For the RC filter, RC was chosen by ensuring that 6*RC=tint, which equals to 5 μs (for example) and leads to a cut-off frequency of 191 kHz and a gain having a 6/(tint) roll-off for frequencies above fc. For the RC integrator, the gain roll-off is 1/(tint). This means that the AC attenuation at high frequencies is six times higher than the RC filter. The RC integrator acts similar to a 32 kHz RC filter in terms of gain at high frequencies.

Returning to the example of a 450 kHz noise tone, this translates into an improvement of the SNR by a ratio of six, leading to a SNR equal to five, which means that the original SNR=0.18 has been improved by a factor of 27 times.

Looking more in detail to the filters Bode diagram shown in FIG. 8, one can observe a fundamental difference of behavior between the two systems. While the RC filter exhibits a Bode diagram tending to 0 dB towards the low frequencies, the RC integrator exhibits an increasing gain at low frequencies. It could translate into a loss of SNR towards the low frequencies. However, as the noise is contained within a certain band and is exhibiting a certain power spectrum, the overall effect of the RC integrator is complex to analyze. A noise model is used so as to simulate the system and the outcome is that this second proposed version of the invention is improving the SNR by at least a factor of two yielding to an overall improvement with a factor close to ten.

Figure 9:
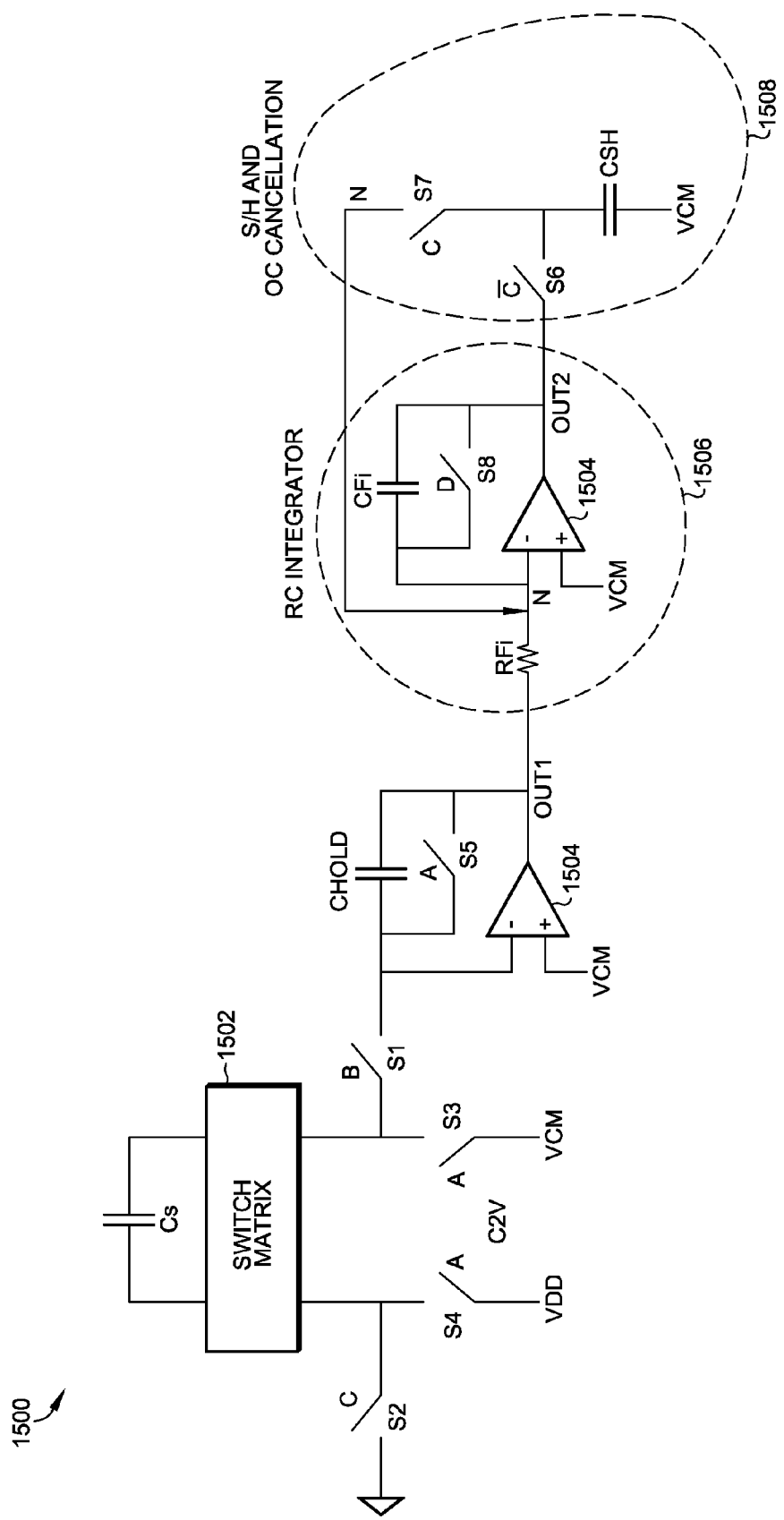
FIG. 9 is a circuit diagram of a touchscreen system according to a second aspect of the present invention.

A second implementation of the first aspect of the present invention is now described in further detail, with respect to FIG. 9. Circuit 1500 includes an external capacitor Cs, switch matrix 1502, a charge amplifier 1504 and a CHOLD capacitor, an RC integrator 1506, and a sample and hold and DC cancellation block 1508.

Figure 10:
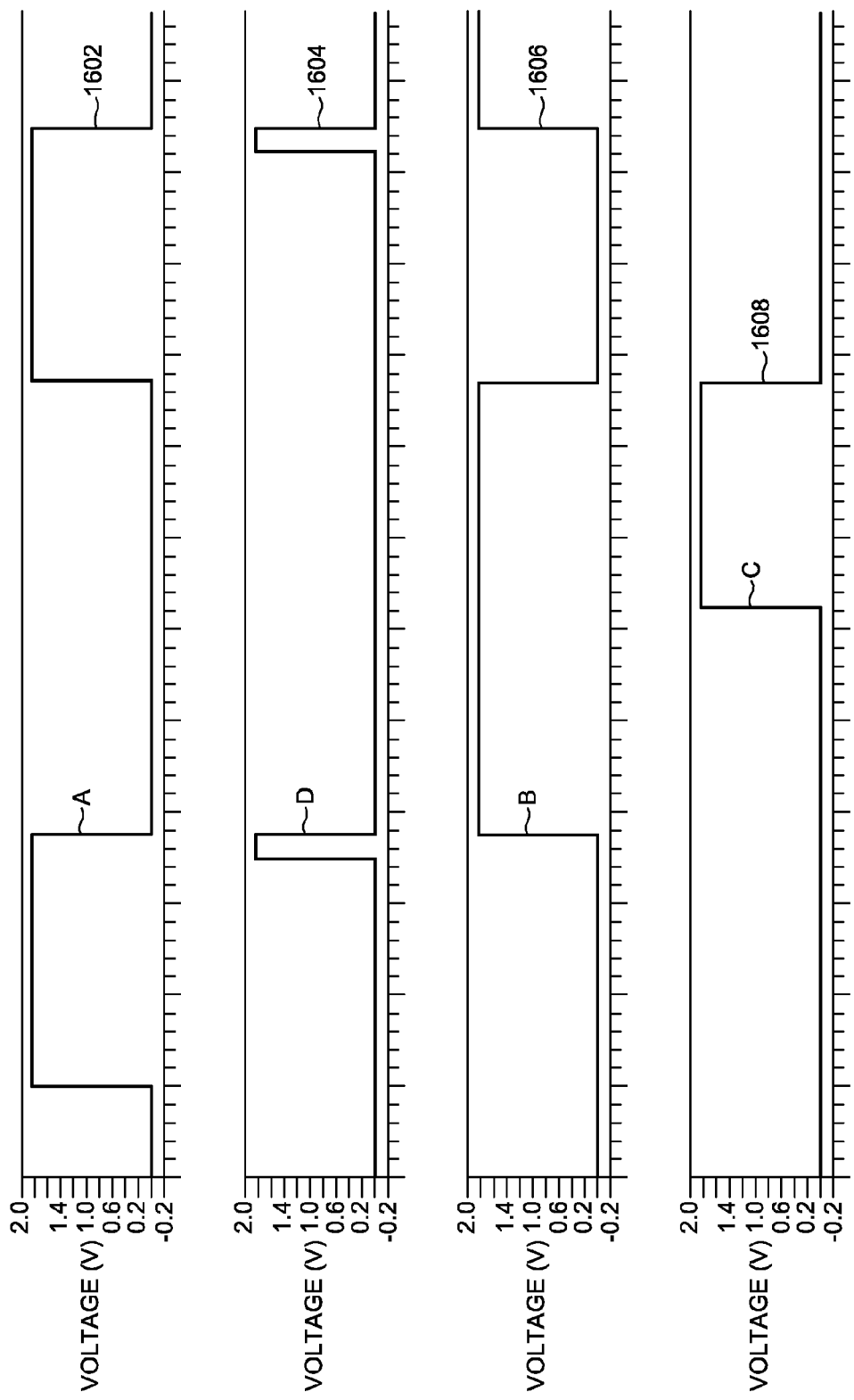
FIG. 10 is a timing diagram associated with the circuit of FIG. 9.

The timing of the control signals A, B, C, D are shown in FIG. 10. The system of FIG. 9 includes a means to cancel the offset of the amplifiers. These means are standard and known in the art and they are not represented in this figure.

The DC shift cancellation is performed inside the RC integrator 1506 rather than inside the C2V 1504 (see, feedback with reference to node N). The DC shift resulting from the noise is integrated in response to the signal C as well as in response to the signal B. As a consequence, the DC observed at the end of the high state of signal B must be subtracted twice by anticipation of the on-going DC shift that is going to be further integrated during signal C. This can be done by charging a capacitor CSH (having a capacitance which is equal to two times the capacitance of the integrating capacitor Cfi) and discharging it into capacitor Cfi through feedback at node N just before the beginning of signal C going high. Alternatively, the integrating capacitor Cfi could be simply swapped during the logic high state of signal C and it would produce exactly the same result without the cost of any additional capacitance, but would require additional switches. "Swapping" means just before the signal C going to a logic high transition, the right/left terminal of capacitor Cfi could be disconnected and reconnected the other way around (i.e., opposite). The output voltage of the integrator would change from VOUT2 (referring to FIG. 9)=VCM+V(Cfi) to VOUT2=VCM−V(Cfi).

The first aspect of the present invention can be summarized as described below.

An input noise induces an initial DC shift inside a C2V converter, the DC shift being dictated by the value of the external noise at the time when the C2V starts its integration. An architecture and a "protocol" are proposed so as to cancel the DC shift and so as to filter efficiently the remaining HF noise ripple. The architecture is composed of a conventional C2V converter, a low-pass filter or preferably an RC integrator capable of filtering the HF and to restitute the DC. An additional "offsetting" structure capable of canceling the DC shift directly inside the C2V converter or inside the RC integrator is also included. The "offsetting" structure can be composed of a capacitor plus switches or switches only.

The protocol comprises a reset phase (R) where the input capacitance is reset, a monitoring (M) phase where the noise is integrated and an "instantaneous" cancelling (Ca) event occurring at the early beginning of the integrating phase Φ and lasting a short while. At this particular time, the previously integrated noise is cancelled. An integration Φphase is also included where the noise and the signal are both integrated.

Figure 13:
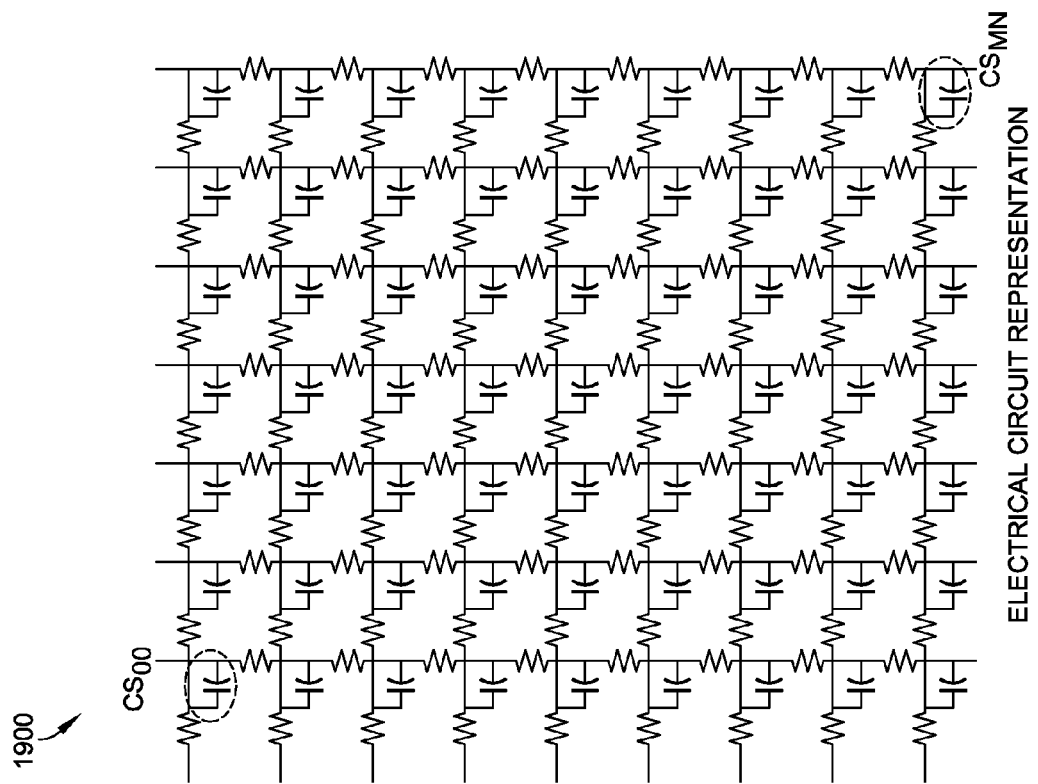
FIG. 13 is a schematic diagram of an electrical circuit representation of the capacitive touch panel shown in FIG. 12.
Figure 12:
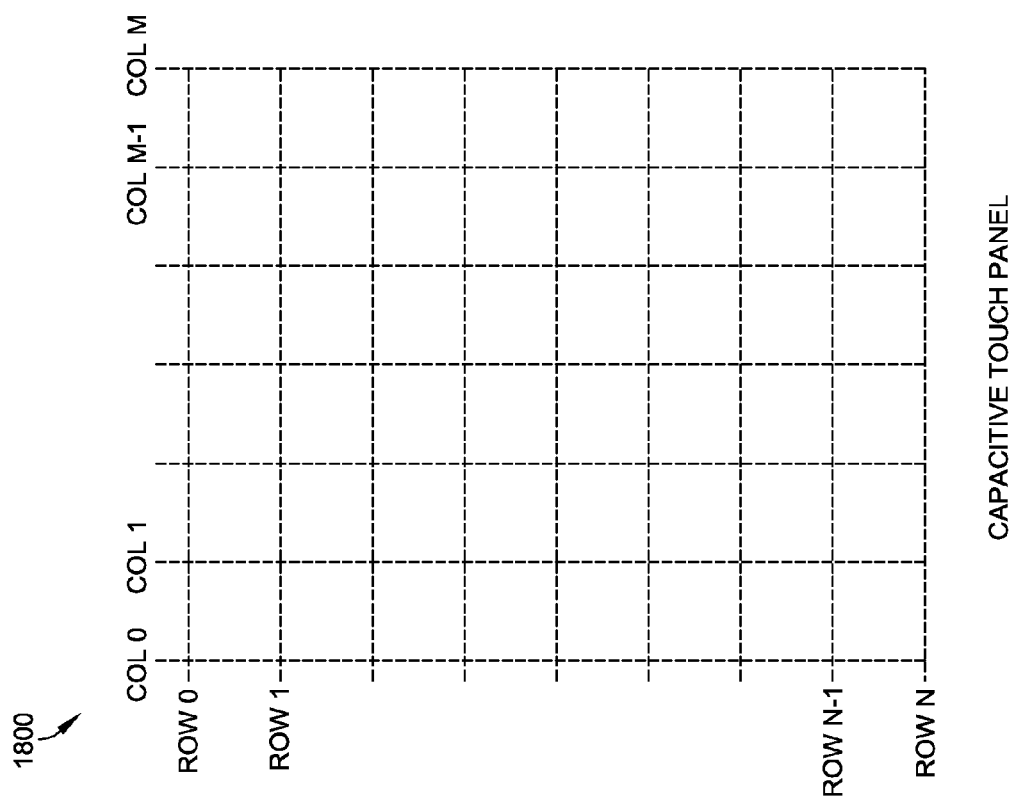
FIG. 12 is a schematic diagram of a capacitive touch panel showing rows and columns thereof.

A second aspect of the invention is now described, involving inserting a transition time period (T), in addition to that which has been previously disclosed. This transition time period involves an additional phase Φ3 that did not exist with respect to the first aspect of the invention. Referring to FIG. 12, a capacitive touch panel 1800 is shown having column lines COL 0 through COL M, and row lines ROW 0 through ROW N. The corresponding electrical circuit representation 1900 is shown in FIG. 13, wherein the touch panel is shown as a distributed capacitive and resistive circuit array. Notice the identification of a first capacitor CS00 in the array, and a last capacitor CSMN in the array.

Figure 14:
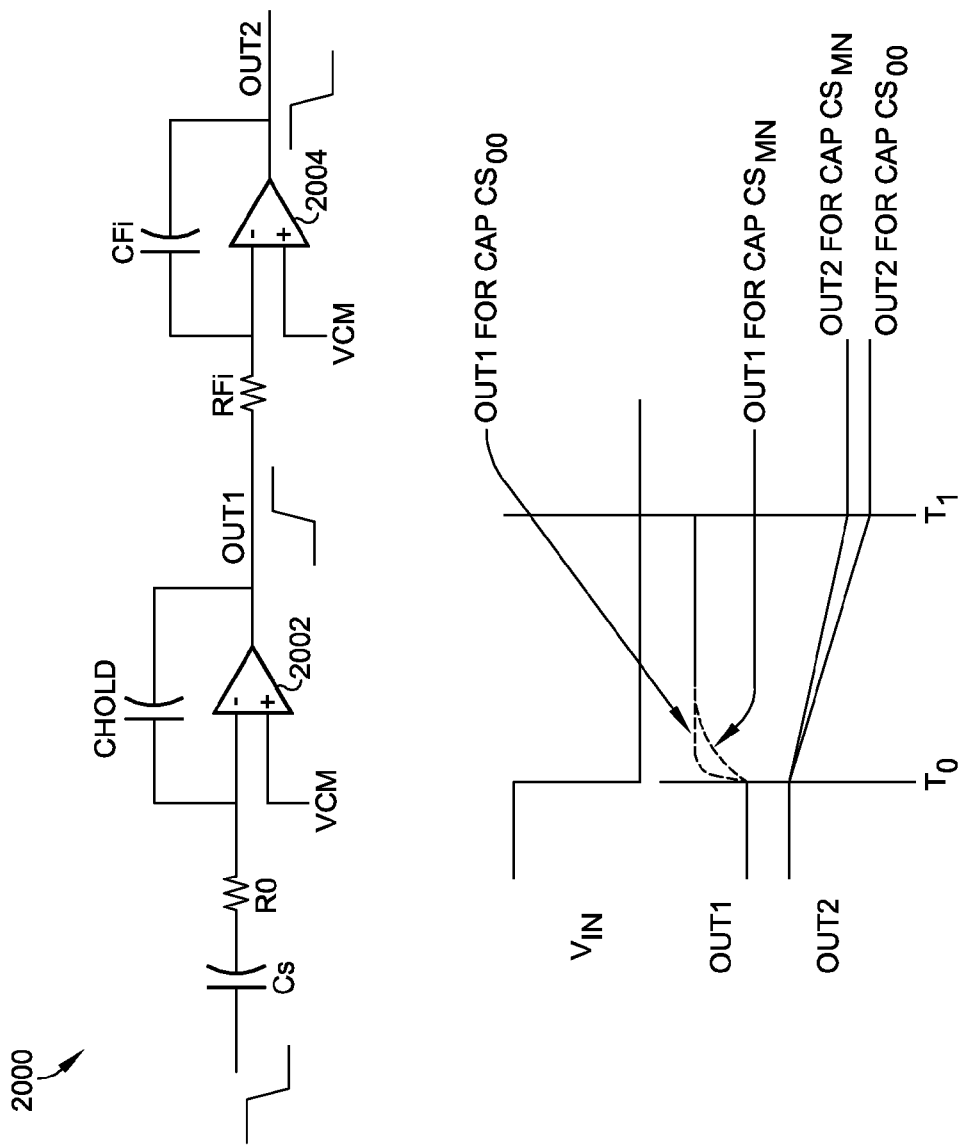
FIG. 14 is a schematic diagram of a portion of the touchscreen system according to the present invention illustrating a problem related to the sensing of the distributed RC capacitive touch panel.

Referring now to FIG. 14, a circuit 2000 essentially as previously described includes a charge-to-voltage section including charge amplifier 2002 and a low pass filter or integrator section including amplifier 2004. A corresponding timing diagram is also shown in FIG. 14, in which an input signal Vin is shown, and voltages OUT1 and OUT2 are also shown. Vin is the force signal (referring to FIG. 3) activated by switches S2/S4 (Referring to FIGS. 4/5). The OUT1 voltage is the output of the charge amplifier 2002, and the OUT2 voltage is the output of amplifier 2004. Integration/monitor time is from time t0 to t1. Because of different RC loads at different panel locations, i.e., comparing CS00 and CSMN, OUT2 voltages will be different.

Figure 15:
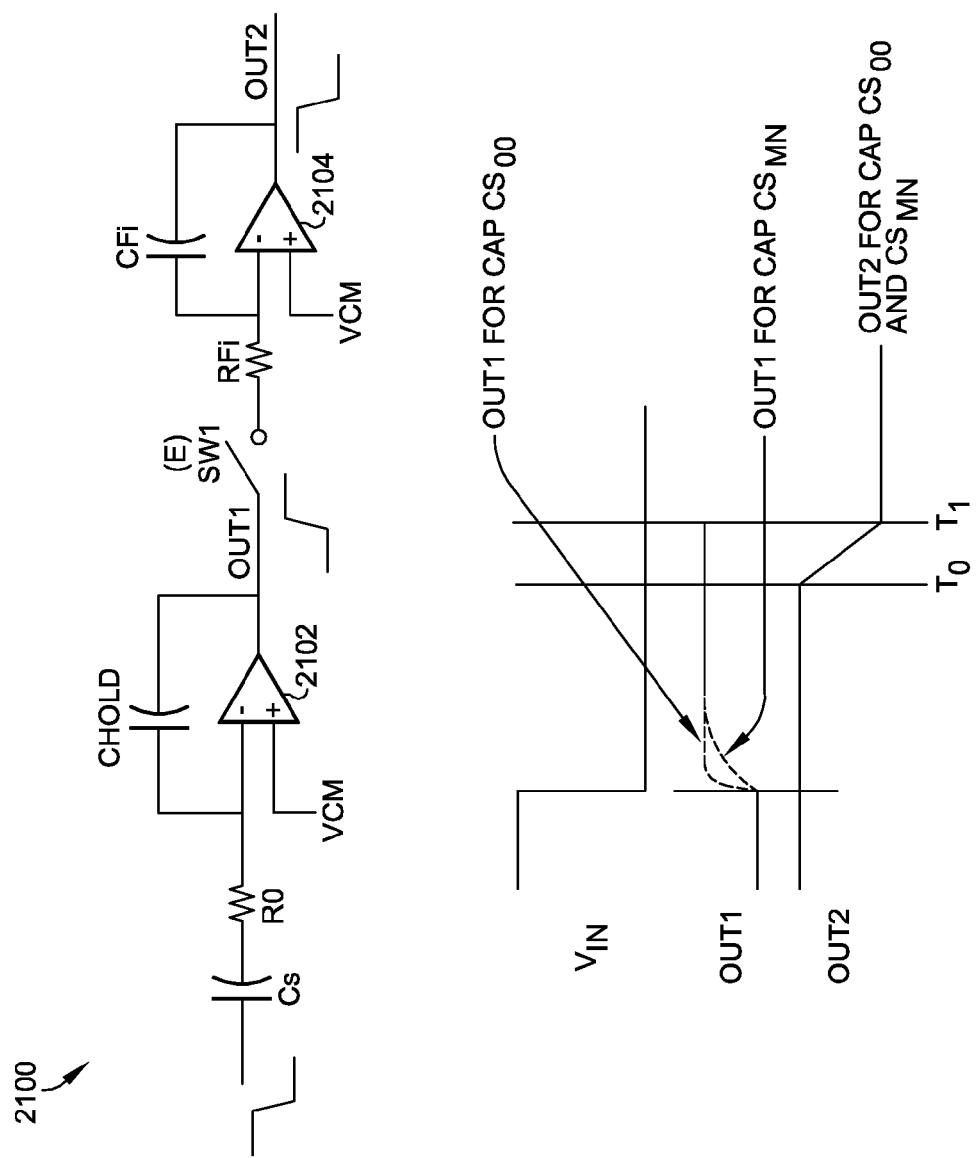
FIG. 15 is a schematic diagram of the same portion shown in FIG. 14, but modified according to the present invention to include an additional switch for addressing the distributed RC capacitive touch panel problem.

Referring now to FIG. 15, a circuit 2100 essentially as previously described includes a charge-to-voltage section including charge amplifier 2102 and a low pass filter or integrator section including amplifier 2104, as well as a switch SW1 for selectively coupling the OUT1 voltage to the input of the low pass filter, not previously described. A corresponding timing diagram is also shown in FIG. 15, in which an input signal Vin is shown, and voltages OUT1 and OUT2 are also shown. The OUT1 voltage is the output of the charge amplifier 2102, and the OUT2 voltage is the output of amplifier 2104. A transition time T is implemented before the M and I (monitoring and integration) periods so as to give time to the panel to settle uniformly whatever the location which is forced/sensed. The transition time is implemented by inserting switch SW1 as is shown in FIG. 15 controlled by signal E. Switch SW1 is open until time $T_0$; SW1 is closed during the time period from $T_0$ to $T_1$.

In summary, the second aspect of the present invention includes a Reset phase (R) where the input capacitance is reset, a transition phase (T) where the touch matrix has time to settle, a monitoring (M) phase where the noise is integrated, and an "instantaneous" Cancelling (Ca) event occurring at the early beginning of the Integrating phase and lasting a short while. At this particular time, the previously integrated noise is cancelled. A transition phase (T) is where the Touch Matrix has time to settle, and an Integration Φphase is where the noise and the signal are both integrated. Considering the RMI protocol (first aspect of the invention), only one transition T is necessary as the R itself has the effect of a transition to zero (R=reset), preceding the M. The RMTI protocol is derived from the RMI protocol. However, as is explained in further detail below, the RIM protocol is also considered, which requires a T before the I and a T before the M. As a result, the RTMTI protocol is implemented.

Figure 16:
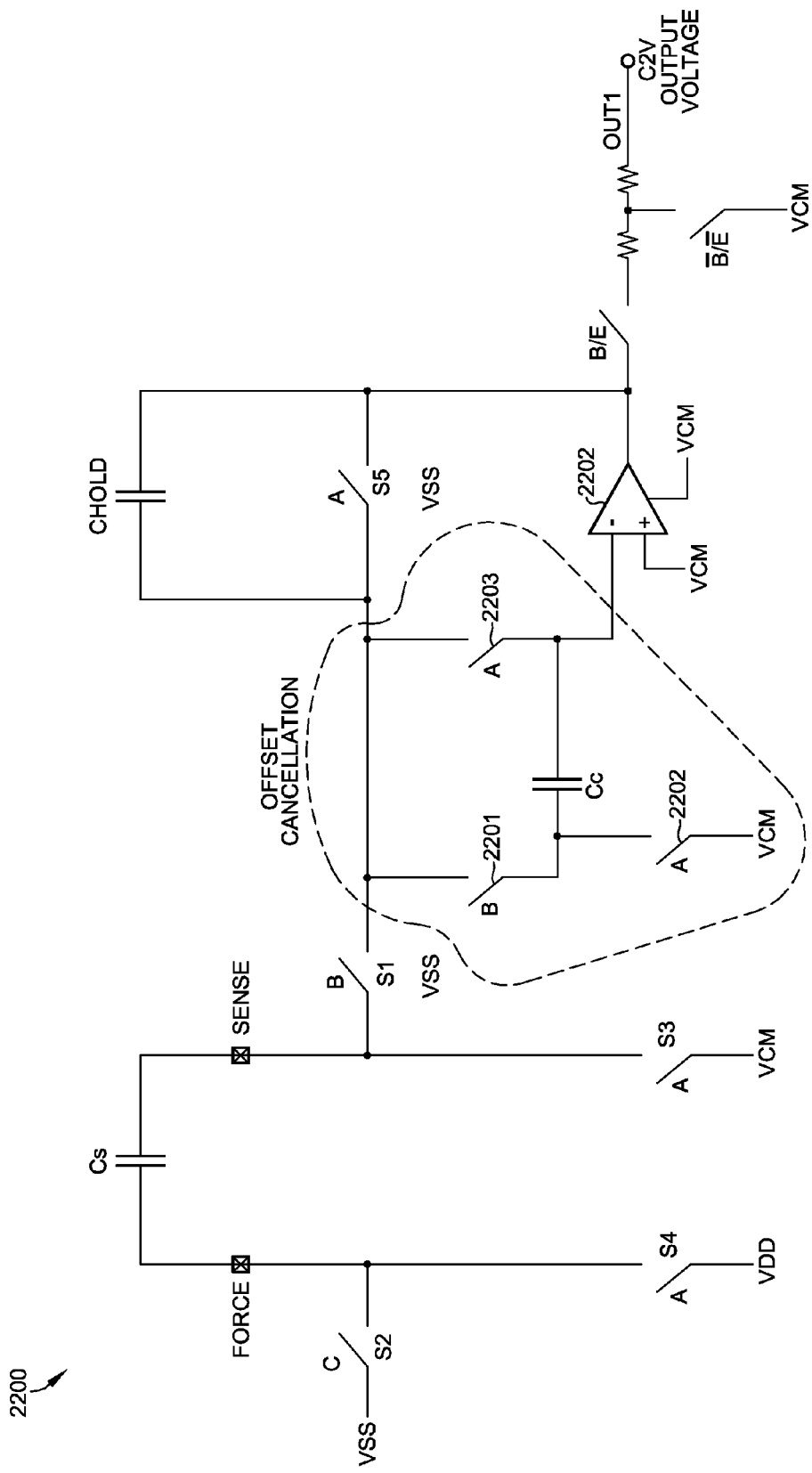
FIG. 16 is a schematic diagram of a practical embodiment of a C2V converter for use in the first and second aspects of the present invention, including unclaimed offset cancellation.

Referring now to FIG. 16, a practical embodiment of a C2V converter or charge amplifier 2200 is shown for use in the first and second aspects of the present invention. Circuit 2200 is essentially as previously described. Capacitor Cc along with the three surrounding switches 2201, 2202, 2203 forms an amplifier's unclaimed offset cancellation circuit as previously mentioned, and is known in the art. Capacitor Cc and the three surrounding switches are intended to cancel the offset of the amplifier. It is not related to the S/H and DC cancellation previously described. The phases associated with each switch are given, substantially as previously described. The final switches 2204 and 2205 in FIG. 16 are controlled by signal B in the first aspect of the invention and controlled by signal E in the second aspect of the invention.

Figure 17:
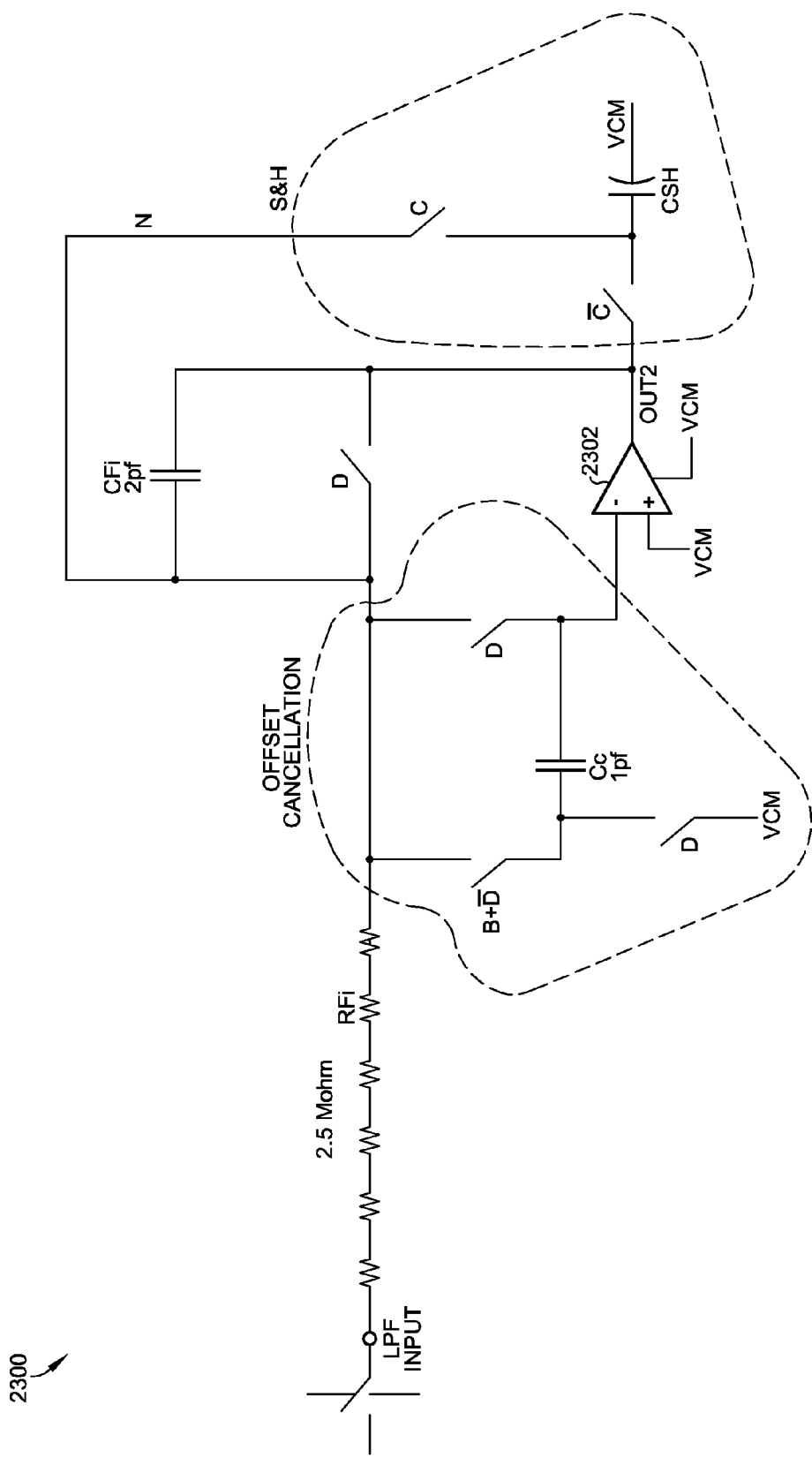
FIG. 17 is a schematic diagram of a practical embodiment of a low pass filter or RC integrator for use in the first and second aspects of the present invention, including unclaimed offset cancellation.

Referring now to FIG. 17, a practical embodiment of a LPF or RC integrator 2300 is shown for use in the first and second aspects of the present invention. Circuit 2300 is essentially as previously described. Capacitor Cc has a value of 1 pF, and capacitor Cfi has a value of 2 pF. The phases associated with each switch are given, substantially as previously described.

The C2V output voltage is as follows:
Max signal=VCM+Cs/CHOLD*VDD
Max noisepp=Vnpp*CFINGER/CHOLD
Max C2V output=VCM+Cs/CHOLD*VDD+Vnpp*CFINGER/CHOLD<VDD
- ○=>(Cs*VDD+CFINGER*Vnpp)/CHOLD<VCM
- ○=>Ci>(Cs*VDD+CFINGER*Vnpp)VCM
- ○=(2 pF*1.8V+0.5 pF*2V)/0.9V=5.11 pF
- ○=>CHOLD=6 pF (CHOLD−15%=5.11 pF)

The above equations describe how to correctly size the CHOLD capacitance to make sure that the output of the C2V converter never reaches saturation. The derivation of the equations is done assuming a given Cs capacitance value, a given supply voltage VDD, a given noise voltage Vnpp, a given CFINGER capacitance value, and further assuming that any integrated capacitance may vary by ±15% of its expected value.

Figure 11:
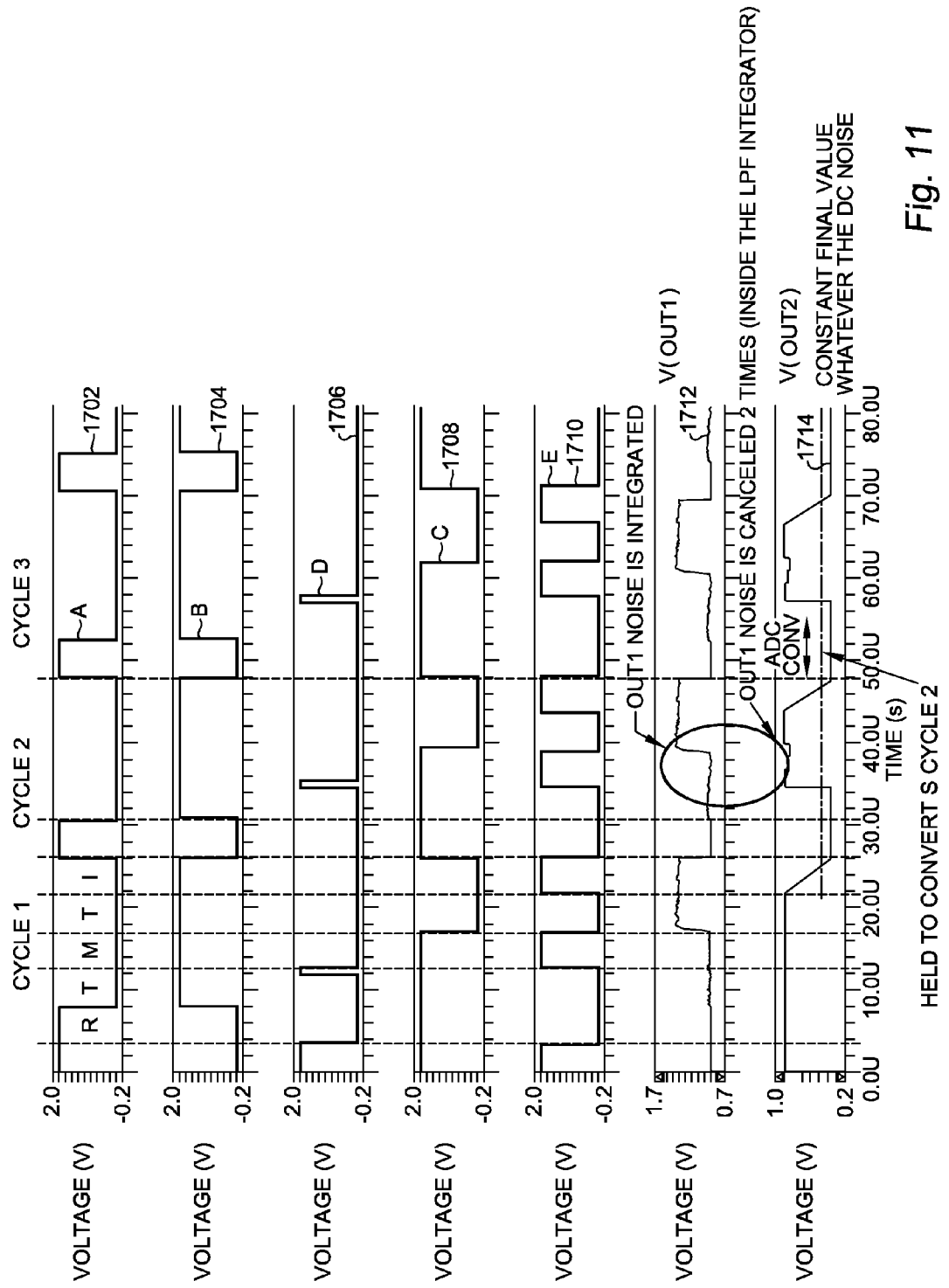
FIG. 11 is a timing diagram associated with the second aspect of the invention.

A timing diagram is shown in FIG. 11 that is associated with the second aspect of the invention and includes the signals A and B, 1702 and 1704, respectively, and the signal D 1706. It is important to note that in the first and second aspects of the invention, the RC integrator is reset once after the first T period. Also depicted are the signal C 1708, the signal E 1710, the C2V output signal 1712, and the low pass filter output signal 1714.

Referring now generally to FIGS. 18-22, a third aspect of the present invention is now described related to digital noise cancellation.

The protocol previously presented and described is tailored to accommodate an analog cancellation of the DC shift. The analog method of the present invention can be extended to the usage of an ADC. In this particular case, the analog "offsetting" structure is not used anymore and the initial protocol previously described is used advantageously so as to perform two ADC conversions per cycle, the first conversion (the conversion of the Noise alone) being performed during the second T period, just after the M period. The second conversion (the conversion of the Signal+Noise) is performed during the first T period of the next cycle. The RC integrator need only hold the signal during the T periods while the ADC is performing its conversion.

In other words, after the M period the voltage is held inside the RC integrator during the T periods so as an ADC can perform a conversion to get the noise value. At the end of the T periods, the RC integrator is RESET.

After the I and next R periods, the voltage is held inside the RC integrator during T period again so as the ADC can perform the Signal+Noise conversion.

It is to be noted that the RC integrator is RESET after each T period wherever T is preceding an M or an I period as there is no more analog cancellation of the error, but the error is canceled by the difference of the two successive readings done by the ADC. This is a notable difference from the first and second aspects of the invention, in which the RC integrator was reset once after the first T period only.

It is to be noted as well that M and I periods can be swapped for some purposes as the output signal can be computed as S=(S+N)−N in case the sequence is TMTI and S=−[N−(S+N)] in case the sequence is TITM. In other words, the digital cancellation allows to use two different protocols RTMTI and RTITM. This feature is described in the above-referenced co-pending patent application, which is incorporated by reference.

As will be explained in further detail below it is also possible to use the two previously described protocols combined with analog cancellation, provided that some modifications are done in the signal C timings.

Figure 18:
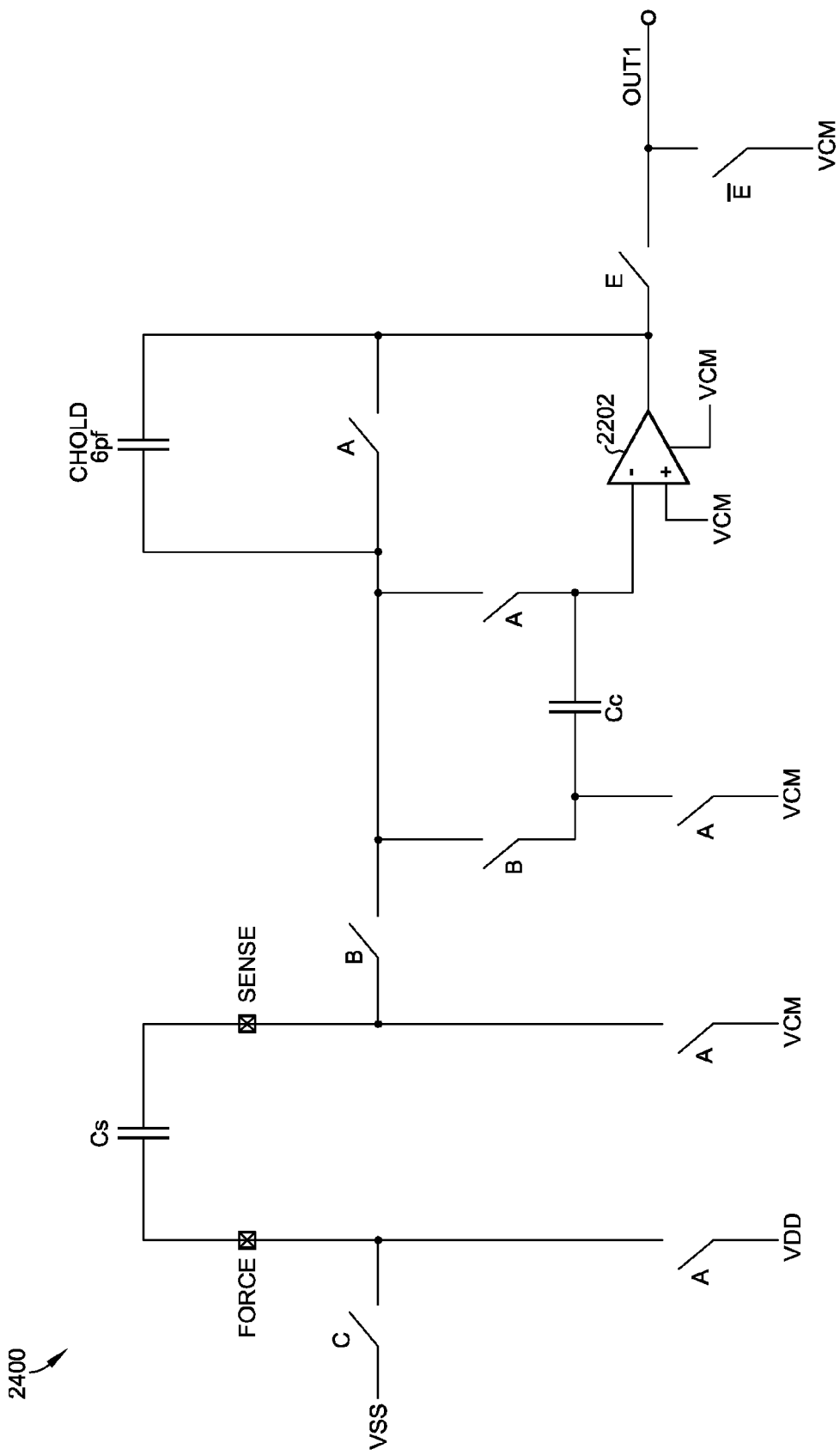
FIG. 18 is a schematic diagram of a capacitance-to-voltage converter for a touchscreen sensing system according to a third aspect of the present invention, including unclaimed offset cancellation.

A capacitance-to-voltage converter 2400 appropriate for the digital noise cancellation method of the present invention is shown in FIG. 18.

Figure 19:
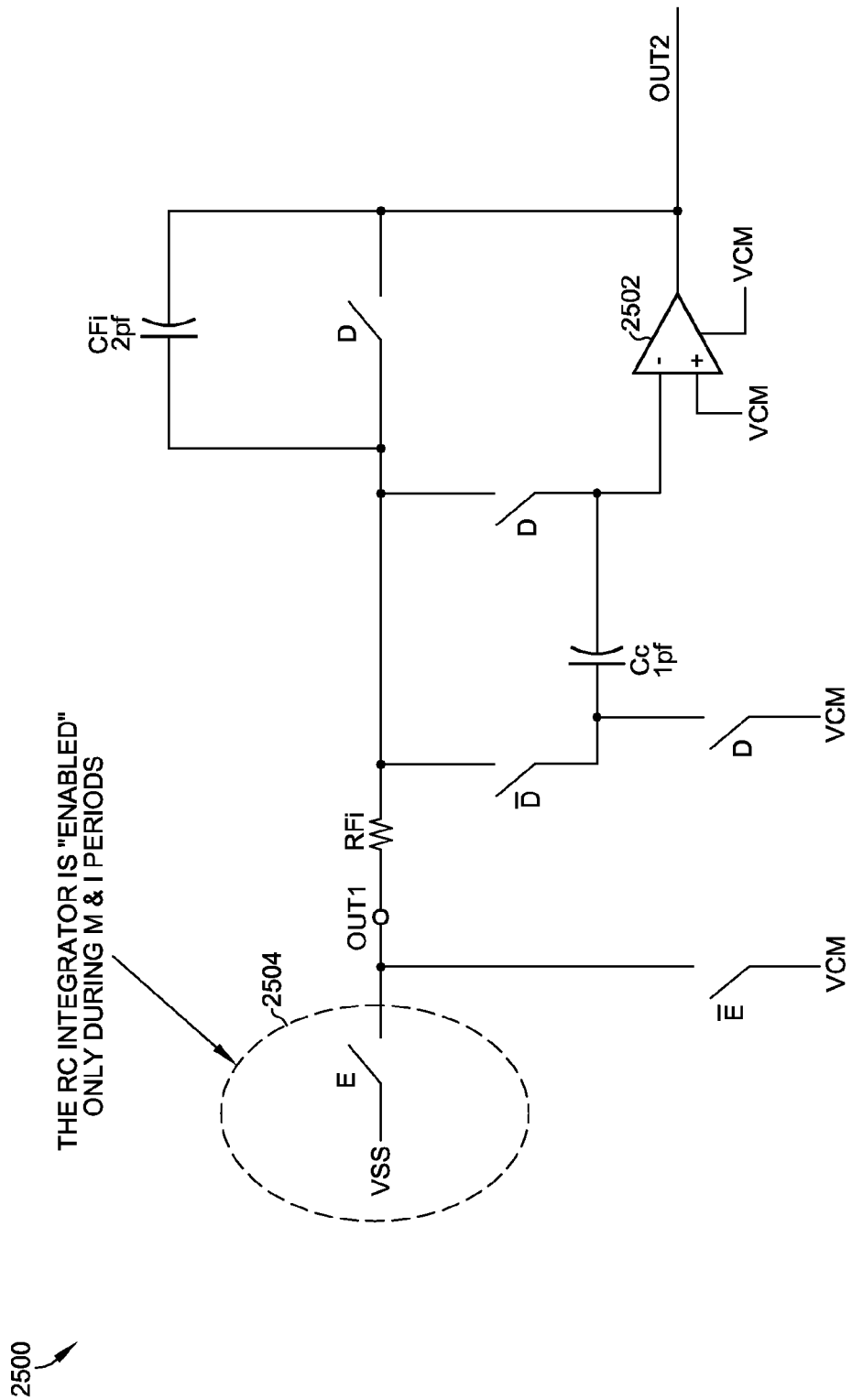
FIG. 19 is a schematic diagram of a low pass filter for a touchscreen sensing system according to a third aspect of the present invention, including unclaimed offset cancellation.

A low pass filter (RC integrator) 2500 appropriate for the digital noise cancellation method of the present invention is shown in FIG. 19. Note that switch 2504, and thus RC integrator 2500, is enabled only during the M and I periods as previously discussed with respect to the second aspect of the invention. The previous version (analog) does include a S/H structure, which is absent in the digital version. The phases are the same but the timing of signal D is different as discussed above.

Figure 20:
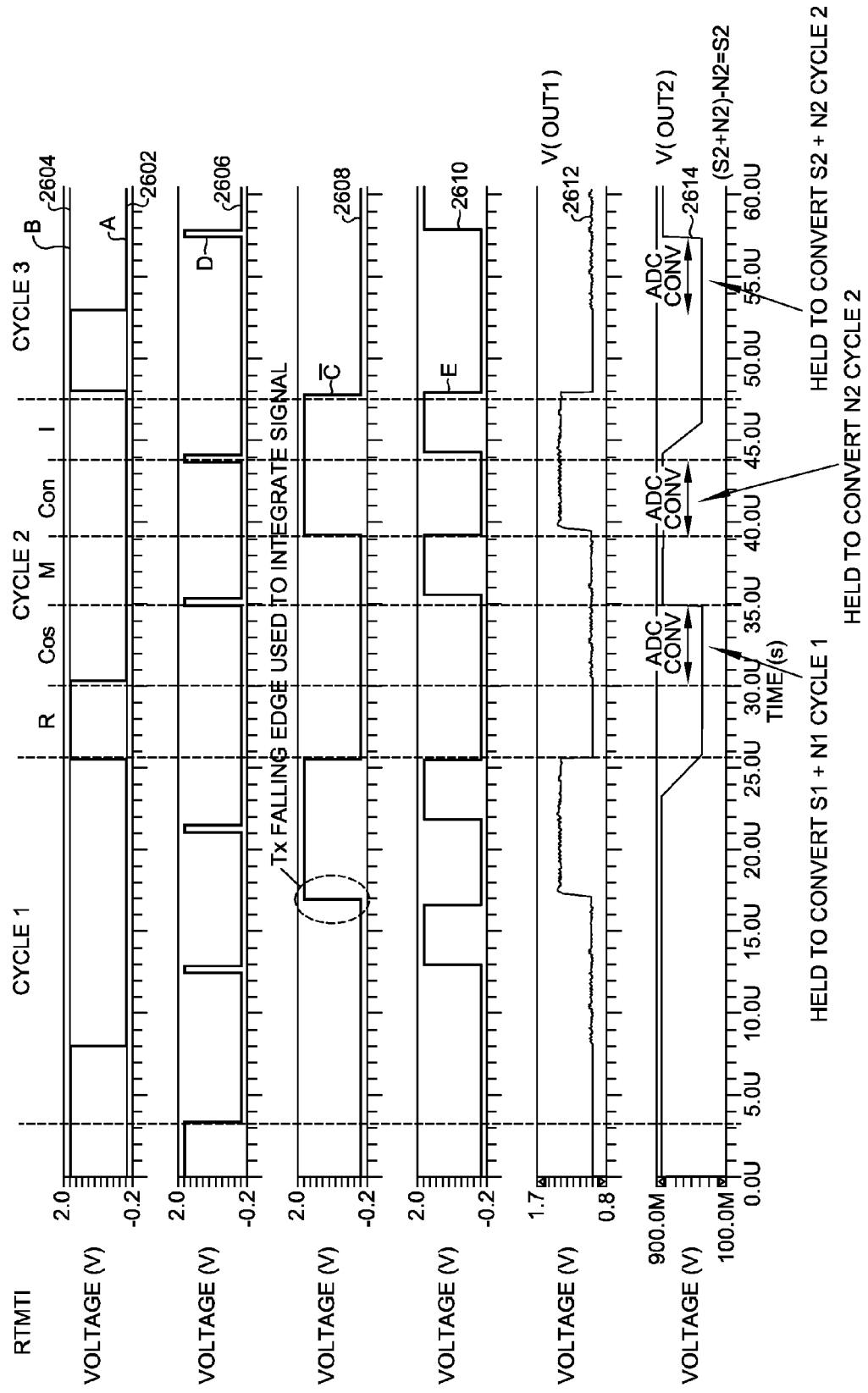
FIG. 20 is a timing diagram associated with the third aspect of the present invention.

Referring now to FIG. 20, an RTMTI mode of operation is shown having three cycles of operation. The phase switching waveforms 2602, 2604, 2606, 2608, and 2610 are shown, as well as the output of the C2V converter 2612 and the output of the ADC 2614.

Figure 21:
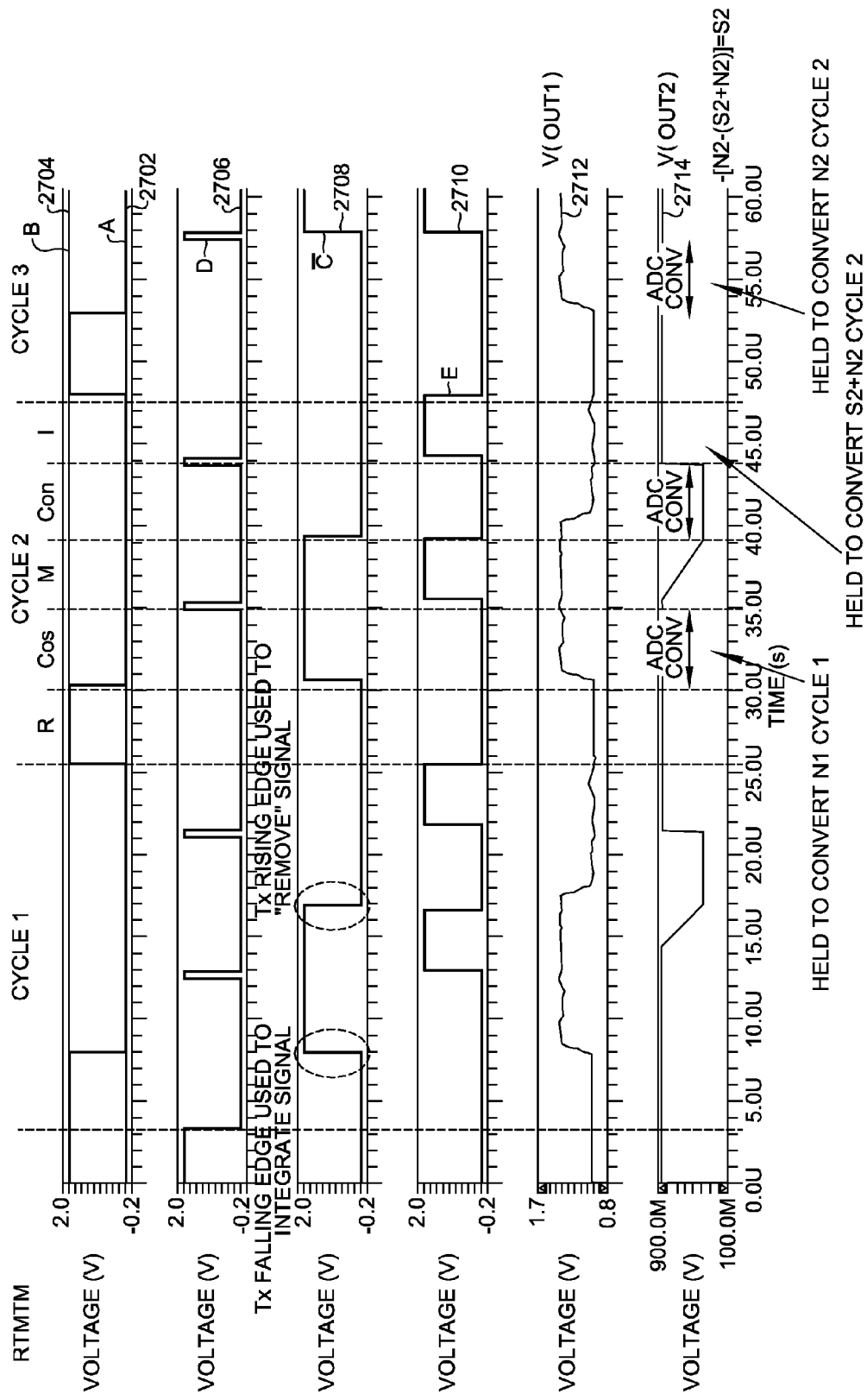
FIG. 21 is an additional timing diagram associated with the third aspect of the present invention.

Referring now to FIG. 21, an RTITM mode of operation is shown having three cycles of operation. The phase switching waveforms 2702, 2704, 2706, 2708, and 2710 are shown, as well as the output of the C2V converter 2712 and the output of the ADC 2714.

Figure 22:
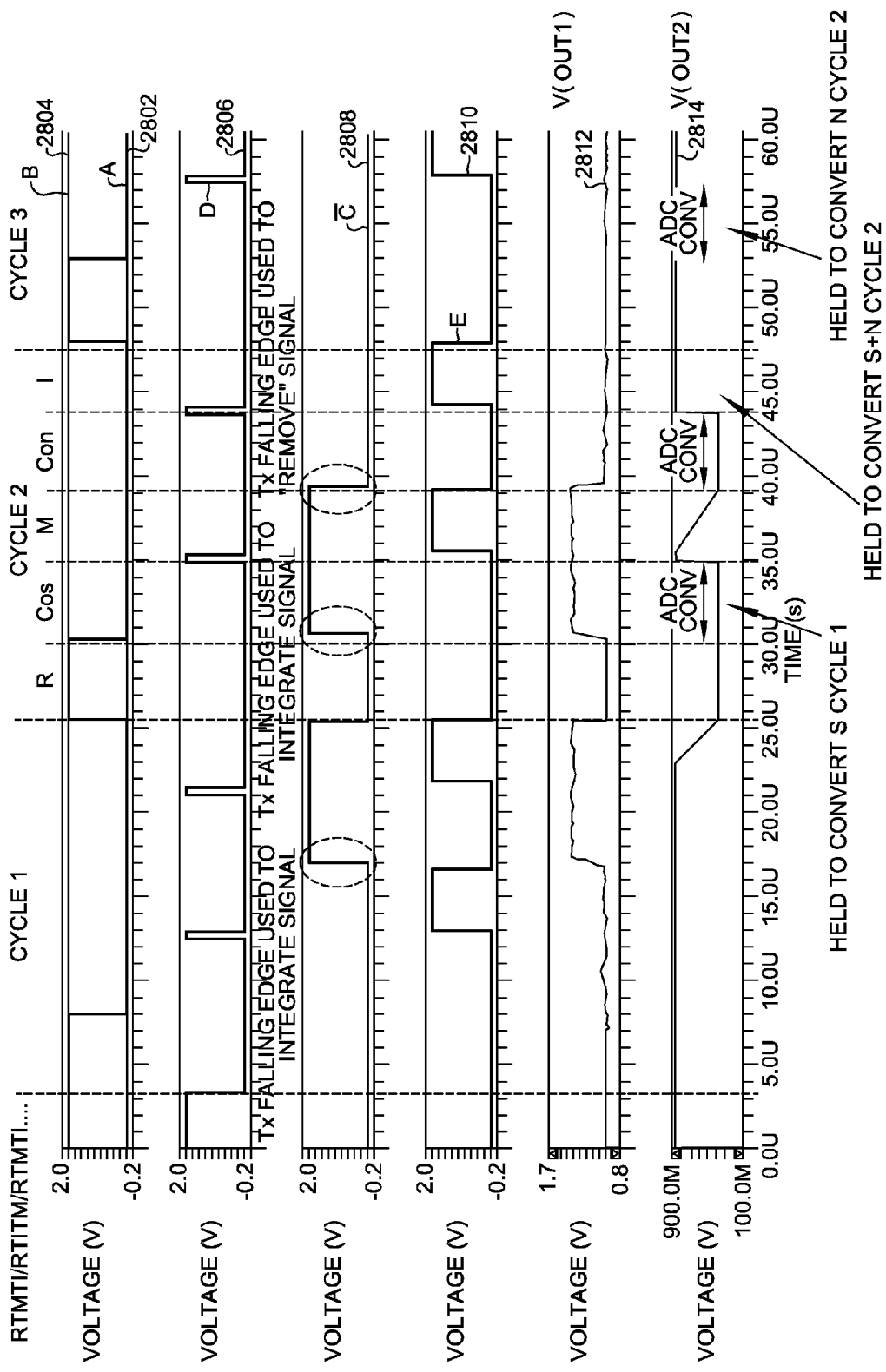
FIG. 22 is yet another timing diagram associated with the third aspect of the present invention.

Referring now to FIG. 22, a composite mode of operation is shown having three cycles of operation. The phase switching waveforms 2802, 2804, 2806, 2808, and 2810 are shown, as well as the output of the C2V converter 2812 and the output of the ADC 2814.

Any protocol RTMTI, RTITM is sensitive to a particular noise frequency.

Example 1 RTMTI RTMTI RTMTI RTMTI

In this example, a signal S exists having a T0 period that is captured at every I period, making it sensitive to any perturbation that would occur at a T0 period or sub-multiple of the T0 period or multiple of the T0 period.

Example 2 RTITM RTITM RTITM RTITM

In this example, the same sensitivity exists.

Example 3 RTITM RTMTI RTITM RTMTI

In this example, the protocol is not sensitive to the submultiple or multiple of T0, but is sensitive to other ranges in the spectrum. Note that the period between the I periods is less than or greater than T0 for subsequent modes of operation.

Example 4 RTITM RTITM RTMTI RTMTI RTITM RTITM

In this example, another combination is shown. By selecting the sequence, one can make sure that the system is not sensitive to a particular tonal noise/spur. It is important to note that there is no best choice, only one or more preferred sequences that are not sensitive in a particular operating environment.

In summary, the method of the third aspect of the present invention is a protocol for operating the front end of the touchscreen system including a Reset phase (R) where the input capacitance is reset, a Transition phase (T) where the touch matrix has time to settle, a Monitoring (M) phase where the noise is integrated, a Transition phase (T) where the touch matrix has time to settle, and an Integration (I) phase where the noise and the signal are both integrated. The signal C falling edge is used to integrate the Signal. Noise cancellation is done by double sampling of the Noise and Signal+Noise. More precisely, this is actually a Correlated Double Sampling of the Noise. As shown in FIG. 21, an RTITM protocol is also possible. In this case, the signal C falling is used to integrate the Signal and the signal C rising edge is used to "remove" the DC component of the signal.

A fourth aspect of the present invention related to DC Shifting and using a half supply input range ADC is now discussed with respect to FIGS. 3, 23, and 24. As shown in FIG. 23, a single edge of the Force signal 2902, either a falling edge is used to transfer charges from capacitor Cs to capacitor CHOLD. For example, using only the falling edge, the integrator output OUT2 (2904) will go from VCM towards ground. This will only require an ADC having an input dynamic range from VCM to ground.

Referring now to FIG. 24, during the Monitoring phase, because the noise level could be either positive or negative, OUT2 voltage will be either above or below VCM as shown. As the ADC only has a half supply input range, OUT2 has to be level-shifted by one quarter of the supply. In the timing diagram of FIG. 24, the force signal 3002, the Voffset signal 3004, and the VCM*(Coffset/Cint) signals 3006 are shown.

Circuit 902 shown in FIG. 3 is implemented for this purpose. During the Transition phase which is before the Monitoring phase, Voffset toggles from VCM to ground, and OUT2 is shifted down by VCM*(Coffset/Cint). The noise level is shifted right in the center of the ADC input range, and the noise can be converted into a digital code with ADC input dynamic range from VCM to ground.

A fifth aspect of the present invention is now discussed, related to analog cancellation of noise combined with RTMTI/RTITM protocols. According to the digital cancellation protocol according to the present invention, the following points should be noted. The RC integrator is RESET after every T period. The M period provides "Noise" and the I period provides "Signal+Noise". Whatever the order (RTMTI or RTITM), the Signal can be retrieved by the difference therebetween. During the RTMTI protocol as well as the RTITM protocol, the Signal is converted (in the C2V) during the falling edge of signal C (output of the C2V is rising into the upper range and output of the RC integrator is falling into the lower range). During the RTITM protocol only, the Signal is "removed" during the rising edge of signal C (output of the C2V goes back to 0). The C2V output always goes to the upper range when the Signal is present and the output of the RC integrator always goes to the lower range.

According to the fifth aspect of the present invention, a method is described for how the RTITM protocol can be also extended to the Analog Cancellation without any additional changes to the existing system and especially without any changing in the ADC input range requirement. The discussion below can refer to FIGS. 16 and 17 describing the first and second aspects of the invention.

According to the Analog Cancellation Protocol of the present invention, the RC integrator is only RESET once per RTMCaTI or RTICaTM cycle. This is similar to what has been described with respect to the first aspect of the present invention. To be more precise, the RESET of the RC integrator occurs at the end of the first T (just before the M if RTMCaTI is used, or just before the I if RTICaTM is used).

During the RTMCaTI protocol, the Signal is converted during the falling edge of signal C (output of the C2V is rising) similarly to what has been described with respect to the first aspect of the invention.

During the RTICaTM protocol, the Signal is converted during the rising edge of signal C (output of the C2V is falling). This is the main difference with respect to the first aspect of the invention.

The cancellation is performed exactly as has been described with respect to the first aspect of the invention.

The fundamental behavioral difference during the RTICaTM protocol is described herebelow. As the "Signal+Noise" is integrated first while Tx rising (TI period):

During TI, the output of the C2V goes toward the lower range;

During I, the output of the RC integrator goes toward the upper range; and

At the end of the I phase, during Ca, the output of the RCintegrator swings back to the lower range because the cancellation operation is operating:

"Signal+Noise"−2*"Signal+Noise"=−"Signal+Noise"

The cancellation operates a kind of "flyback" function from one range (the upper) to another range (the lower).

The output of the RC integrator always stays in the lower range after the Ca and during the TM, and DC shifting is implemented exactly as described with respect to the fourth aspect of the invention.

The architecture of the C2V is similar to the architecture described in FIG. 16 (using signal E) for the second aspect of the invention. It is important to note that at this stage the signal C, although having the same name, is different in terms of timing as has been previously discussed.

The architecture of the RC integrator is similar to the architecture described in FIG. 17. It is important to note that the signal D occurs once per period after the first transition, while in the digital cancellation mode, the signal D occurred after each T period.

Figure 25:
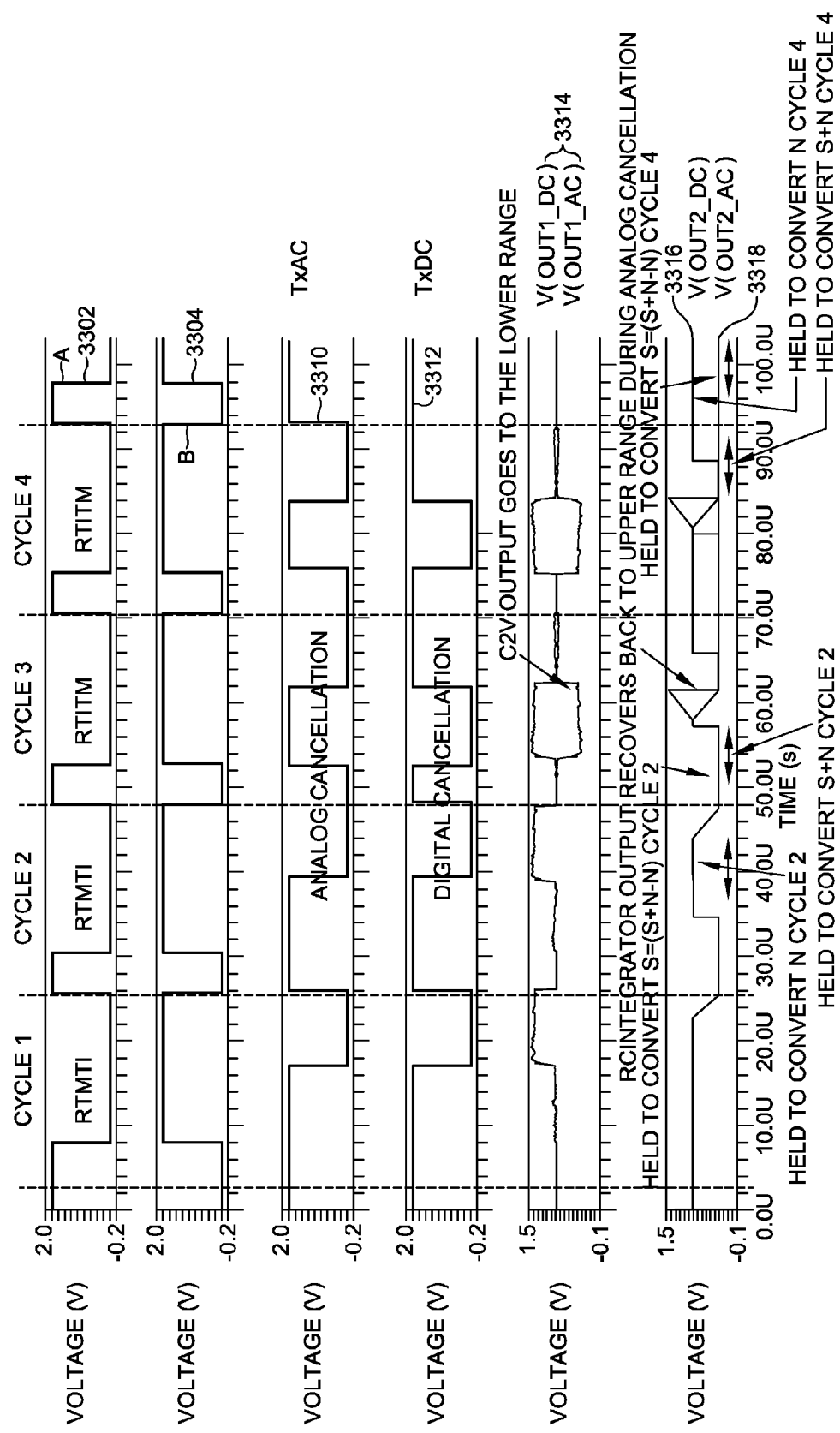
FIG. 25 is a timing diagram associated with the fifth aspect of the present invention.

Referring now to FIG. 25, a timing diagram is shown involving operational cycles Cycle 1 through Cycle 4 representing alternative RTMTI, RTMTI, RTITM, and RTITM modes of operation. Phase signals 3302, 3304, and 3306 are shown. Voltage node signals 3308, 3310, 3312, 3314, 3316, and 3318 are also shown.

FIG. 25 highlights the difference in the signal C, V(OUT1), V(OUT2) in the case of the digital cancellation and the analog cancellation extended to the RTITM protocol (or vice-versa). The signal D signal not being represented, as it has been extensively highlighted and represented in FIGS. 10 and 11 for analog cancellation and in FIGS. 20, 21, and 22 for digital cancellation. V(TxAC) represented signal C in the case of analog cancellation, and V(TxDC) represents signal C in the case of digital cancellation. V(OUT1_AC) and V(OUT2_AC) represents the analog cancellation. V(OUT1_DC) and V(OUT2_DC) represents the digital cancellation. One can observe that the V(OUT2_AC), the output of the RC integrator, can swing into both ranges. However, it always reverts back to the lower range while the Ca (Cancellation) event is occurring.

It is important to note that the DC offset structure described with respect to the fourth aspect of the invention is not implemented here and the noise signal is centered around the VCM rather than being centered in the middle of the lower range. This is not fundamental for the understanding of the system.

In summary, the benefits of the analog cancellation method according to a fifth aspect of the invention using the RTMTI/RTITM modes of operation are as follows. The ability to use the RTMTI and RTITM protocol is ideal for tonal noise rejection as previously described with respect to a third aspect of the present invention. The ability to use the analog cancellation is helpful to suppress one ADC conversion per cycle. However, it is not advantageous if the ADC input range has to cover the lower and upper range as it makes the ADC design more complex. The fifth aspect of the present invention represents a way to address both above constraints. The fifth aspect of the present invention addresses these requirements by using the Analog Cancellation architecture previously described, and choosing an adequate signal C (TxAC) timing depending whether RTMTI or RTITM is selected. It is important to note that, on previous timing diagrams, the DC shift during the Monitoring phase is not included for sake of clarity. However, it should be implemented if one wants to use an ADC with half supply input range.

Referring now to a sixth aspect of the present invention, oversampling to improve SNR and ADC Resolution is now described.

As previously described, there are different methods to improve the SNR of the touchscreen system. One of those methods is to use many cycles and to average the results. The averaging operation can be done in the analog domain with an analog accumulator or alternatively in the digital domain.

Assume an N bit ADC is used to perform the Analog to Digital conversion and that Nacc cycles of accumulation are performed. According to the over-sampling theory, in certain conditions of the ADC input signal, the resolution of the ADC conversion can be extended by one bit for every four times of over-sampling. In other words, with a N=10 bits ADC and Nacc=16 cycles, one can achieve 12 bits of resolution.

According to the present invention, the C2V and RC integrator blocks are implemented in such a way that the noise at the output of the RC integrator is said to be "white" AND its magnitude is in the range of two LSBs of the ten bits ADC. In that condition the over-sampling theory is valid and can be used advantageously so as to reduce the requirement in the ADC resolution for a given system resolution requirement.

Extending further the concept, and by compromising on the touch matrix scanning rate, one can extend the resolution of the system up to 14-16 bits.

It will be apparent to those skilled in the art that various modifications and variations can be made in the present invention without departing from the spirit or scope of the invention. As would be apparent to those skilled in the art, equivalent embodiments of the present invention can be realized with alternative circuit implementations. In addition, although representative block diagrams are shown for an aid in understanding the invention, the exact boundaries of the blocks may be changed and combined or separated out as desired for a particular application or implementation. Thus, it is intended that the present invention cover the modifications and variations of this invention provided they come within the scope of the appended claims and their equivalents.

We claim:

1. A capacitive sensing circuit for a touchscreen system having an improved signal-to-noise ratio, comprising:
   a switch matrix configured to be coupled to an external sampling capacitor and having a force input configured to selectively receive a force signal and a sense output configured to generate a sense signal;

first and second switches coupled to the force input of the switch matrix;

third and fourth switches coupled to the sense output of the switch matrix;

a charge amplifier having a first input coupled to receive the sense signal, a second input coupled to a common mode voltage, and a first capacitor coupled between an output of the charge amplifier and the first input of the charge amplifier;

a low pass filter having an input coupled to the output of the charge amplifier;

a sample-and-hold circuit having an input selectively coupled to an output of the low pass filter and a second capacitor coupled between the input of the sample-and-hold circuit and the common mode voltage, said second capacitor configured to store a DC shift of the sense signal during a first sub-phase when the force signal is selectively not applied to the force input; and a switch circuit configured to selectively connect the second capacitor of the sample-and-hold circuit to the first input of the charge amplifier for subtraction of the stored DC shift from the sense signal at the beginning of a second sub-phase when the force signal is selectively applied to the force input and the charge amplifier operates to integrate the sense signal.

2. The capacitive sensing circuit of claim 1 wherein the first switch is coupled between the force input and a ground node.

3. The capacitive sensing circuit of claim 1 wherein the second switch is coupled between the force input and a supply voltage.

4. The capacitive sensing circuit of claim 1 wherein the third switch is coupled between the sense output and the first input of the charge amplifier.

5. The capacitive sensing circuit of claim 1 wherein the fourth switch is coupled between the sense output and the common mode voltage.

6. The capacitive sensing circuit of claim 1 further comprising a fifth switch for switching the first capacitor of the charge amplifier.

7. The capacitive sensing circuit of claim 1 wherein the low pass filter comprises an RC filter.

8. The capacitive sensing circuit of claim 1 wherein the low pass filter comprises an RC integrator.

9. The capacitive sensing circuit of claim 1 comprising a first phase and a second phase, said second phase including the first and second sub-phases.

10. The capacitive sensing circuit of claim 9 wherein the second and fourth switches are closed during the first phase.

11. The capacitive sensing circuit of claim 9 wherein the first switch is open and the third switch is closed during the second phase.

12. The capacitive sensing circuit of claim 11 wherein the first switch and the third switch are closed during the second sub-phase.

13. A capacitive sensing circuit for a touchscreen system having an improved signal-to-noise ratio, comprising:

a switch matrix having inputs configured to be coupled to an external sampling capacitor and having a force node configured to selectively receive a force signal and a sense node configured to output an external sampling capacitor sense signal;

a first switching circuit coupled to the force node of the switch matrix;

a second switching circuit coupled to the sense node of the switch matrix;

a charge amplifier having an input coupled to receive from the second switching circuit said external sampling capacitor sense signal through the second switching circuit;

a low pass filter having an input coupled to an output of the charge amplifier;

a sample-and-hold circuit having an input selectively coupled to the output of the low pass filter and having a capacitor coupled to the input of the sample-and-hold circuit and configured to store a DC shift voltage of the external sampling capacitor sense signal generated by said low pass filter during a first sub-phase when the force signal is selectively not applied to the force node; and a switch circuit configured to selectively connect the capacitor of the sample-and-hold circuit to the first input of the charge amplifier during a second sub-phase when the force signal is selectively applied to the force node so that said DC shift voltage is canceled by the charge amplifier from the external sampling capacitor sense signal to generate an output signal.

14. The capacitive sensing circuit of claim 13 wherein the low pass filter comprises an RC filter.

15. The capacitive sensing circuit of claim 13 wherein the low pass filter comprises an RC integrator.

16. A capacitive sensing circuit for a touchscreen system having an improved signal-to-noise ratio, comprising:

a switch matrix having inputs configured to be coupled to an external sampling capacitor and having a force node configured to selectively receive a force signal and a sense node configured to output a sense signal;

a first switching circuit coupled to the force node of the switch matrix;

a second switching circuit coupled to the sense node of the switch matrix;

a charge amplifier having a first input connected to the second output of the switch matrix through the second switching circuit and a second input connected to a common mode voltage node;

a low pass filter having an input directly connected to an output of the charge amplifier and having an output;

a third switching circuit having a first terminal directly connected to the output of the low pass filter and having a second terminal;

a sampling capacitor having a first terminal directly connected to the second terminal of the third switching circuit and having a second terminal connected to said common mode voltage node; and a fourth switching circuit having a first terminal directly connected to the first terminal of the sampling capacitor and having a second terminal directly connected to the first input of the charge amplifier;

wherein the third switching circuit is actuated in a first sub-phase when the force signal is selectively not applied to the force node to sample a DC shift of the sense signal for storage on the sampling capacitor; and wherein the fourth switching circuit is actuated in a second sub-phase when the force signal is selectively applied to the force node to apply the DC shift from the sampling capacitor to be subtracted from the sense touch signal at the first input of the charge amplifier.

17. The capacitive sensing circuit of claim 16 wherein the low pass filter comprises an RC filter.

18. The capacitive sensing circuit of claim 16 wherein the low pass filter comprises an RC integrator.

* * * * *